United States Patent
Zhou et al.

(10) Patent No.: US 9,374,717 B2
(45) Date of Patent: Jun. 21, 2016

(54) TRANSMITTING INDICATION OF ACCESS POINT LOADING

(71) Applicant: QUALCOMM Incorporated, San Diego, CA (US)

(72) Inventors: Yan Zhou, San Diego, CA (US); Peerapol Tinnakornsrisuphap, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 173 days.

(21) Appl. No.: 13/846,674

(22) Filed: Mar. 18, 2013

(65) Prior Publication Data

US 2013/0242943 A1  Sep. 19, 2013

Related U.S. Application Data

(60) Provisional application No. 61/612,844, filed on Mar. 19, 2012.

(51) Int. Cl.
| | | |
|---|---|---|
| *H04W 24/02* | (2009.01) | |
| *H04W 48/20* | (2009.01) | |
| *H04W 28/08* | (2009.01) | |
| *H04W 48/06* | (2009.01) | |
| *H04W 74/08* | (2009.01) | |
| *H04W 72/00* | (2009.01) | |

(52) U.S. Cl.
CPC .............. *H04W 24/02* (2013.01); *H04W 28/08* (2013.01); *H04W 48/20* (2013.01); *H04W 48/06* (2013.01); *H04W 72/00* (2013.01); *H04W 74/0833* (2013.01)

(58) Field of Classification Search
CPC ..... H04W 48/06; H04W 48/20; H04W 28/08; H04W 24/02; H04W 74/0833; H04W 72/00
See application file for complete search history.

(56) References Cited

U.S. PATENT DOCUMENTS

| | | | |
|---|---|---|---|
| 5,987,062 A | 11/1999 | Engwer et al. | |
| 6,002,918 A | 12/1999 | Heiman et al. | |
| 2002/0160781 A1* | 10/2002 | Bark et al. | 455/450 |
| 2003/0081584 A1* | 5/2003 | Heo | 370/342 |
| 2004/0109492 A1* | 6/2004 | Viero et al. | 375/130 |
| 2005/0002353 A1* | 1/2005 | Horneman | 370/329 |

(Continued)

FOREIGN PATENT DOCUMENTS

| | | |
|---|---|---|
| EP | 1133208 A2 | 9/2001 |
| EP | 1411739 A1 | 4/2004 |

(Continued)

OTHER PUBLICATIONS

International Search Report and Written Opinion—PCT/US2013/033025—ISA/EPO—Mar. 6, 2014.

(Continued)

*Primary Examiner* — Jianye Wu
(74) *Attorney, Agent, or Firm* — Tyler J. Overall

(57) ABSTRACT

An access point is identified for providing service for an access terminal. In some aspects, the identification of an access point is based on loading at one or more access points. In some implementations, an access terminal selects a cell (e.g., the cell that provides maximum throughput) based on the cell load at one or more cells. In some implementations, load estimation is based on information acquired by an access terminal from nearby access points.

48 Claims, 16 Drawing Sheets

(56) References Cited

U.S. PATENT DOCUMENTS

| | | |
|---|---|---|
| 2005/0271000 A1* | 12/2005 | Schulist .................... 370/328 |
| 2008/0305744 A1* | 12/2008 | Furuskar et al. ......... 455/67.11 |
| 2009/0003279 A1 | 1/2009 | Abusch-Magder et al. |
| 2010/0091651 A1 | 4/2010 | Chin et al. |
| 2011/0143758 A1 | 6/2011 | Bae |
| 2013/0044694 A1 | 2/2013 | Aguirre et al. |
| 2013/0242966 A1 | 9/2013 | Zhou et al. |

FOREIGN PATENT DOCUMENTS

| | | | |
|---|---|---|---|
| EP | 1760947 | A2 | 3/2007 |
| EP | 2077678 | A1 | 7/2009 |
| GB | 2472792 | A | 2/2011 |
| WO | 03107707 | A1 | 12/2003 |
| WO | WO-2009099224 | A1 | 8/2009 |
| WO | WO-2009131337 | | 10/2009 |
| WO | 2011098338 | A1 | 8/2011 |

OTHER PUBLICATIONS

Partial International Search Report—PCT/US2013/033025—ISA/EPO—Oct. 17, 2013.

\* cited by examiner

TRANSMITTING INDICATION OF ACCESS POINT LOADING

CLAIM OF PRIORITY

This application claims the benefit of and priority to commonly owned U.S. Provisional Patent Application No. 61/612,844, filed Mar. 19, 2012, the disclosure of which is hereby incorporated by reference herein.

CROSS-REFERENCE TO RELATED APPLICATION

This application is related to concurrently filed and commonly owned U.S. patent application Ser. No. 13/846,717, the disclosure of which is hereby incorporated by reference herein.

BACKGROUND

1. Field

This application relates generally to wireless communication and more specifically, but not exclusively, to determining access point loading and taking action thereon.

2. Introduction

A wireless communication network may be deployed to provide various types of services (e.g., voice, data, video, messaging, multimedia services, etc.) to users within the coverage area of the network. In a typical implementation, access points (e.g., corresponding to different cells) are distributed throughout a network to provide wireless connectivity for user access terminals (e.g., cell phones) that are operating within the coverage area served by the network.

Conventionally, an access terminal connects to the cell that provides the best signal at the access terminal. For example, an access terminal may measure signals from nearby cells and connect to the cell associated with the strongest received signal.

In practice, such signal measurements may not result in the identification of the best cell for the access terminal. For example, other conditions at the cell may adversely affect the level of service provided by the cell. While an access terminal could rely on the cell to send information indicative of these conditions to the access terminal, this would require that the access terminal be connected to the cell or would require cell modification to enable the cell to broadcast this information.

SUMMARY

A summary of several sample aspects of the disclosure follows. This summary is provided for the convenience of the reader to provide a basic understanding of such aspects and does not wholly define the breadth of the disclosure. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later. For convenience, the term some aspects may be used herein to refer to a single aspect or multiple aspects of the disclosure.

The disclosure relates in some aspects to techniques that facilitate identification of an access point (e.g., identification of a cell of the access point) for providing service for an access terminal (e.g., a UE). For example, these techniques may be used to identify the cell that would provide the best service (e.g., highest throughput) for the access terminal.

In some aspects, the identification of an access point is based on loading at one or more access points. For example, loading at several cells may be determined and the cell with the lowest load may be selected to provide service for the access terminal. Alternatively, loading at a given cell may be checked to see whether the loading is sufficiently low. If so, that cell may be selected to provide service for the access terminal.

The teachings herein may be used to provide service for access terminals in various operational states. For example, the disclosed techniques may be used to select a cell for an access terminal in idle mode (i.e., no connection with any cell). As another example, the disclosed techniques may be used to select a new cell for an access terminal that is connected to another cell.

In some implementations, an access terminal or some other entity selects a cell (e.g., the cell that provides maximum throughput) based on the cell load at one or more cells. These techniques may be employed, for example, when the access terminal is in the presence of multiple cells in different systems (e.g., UMTS, LTE, WiFi, etc.). The cell load may be characterized by various load factors including, for example, a served user number, channelization code usage, time-frequency resource usage, random access channel (RACH) traffic load, etc.

In some implementations, load estimation is based on information acquired by an access terminal from nearby access points. Upon receiving this information, the access terminal may determine whether to initiate communication with (e.g., connect to) one of these access points. Advantageously, the acquired information consists of information transmitted by the access points under normal operations. That is, the access points do not need to be modified to broadcast load information. Hence, the disclosed techniques are applicable to legacy access points that do not support such functionality.

In some implementations, an access terminal receives loading information from another entity. For example, a first access point (e.g., comprising a network listen module) may acquire the information transmitted by nearby access points and then broadcast an indication of the loading at these access points (e.g., loading at cells of the access points). An access terminal in the vicinity of the first access point may thereby acquire this loading information and determine whether to initiate communication with (e.g., connect to) one of these access points based on the loading information.

In some implementations, an access point may use acquired neighboring cell load information to determine whether to redirect users to lightly loaded neighboring cells. For example, a femtocell including a network listen module may redirect access terminals to a neighboring cell on a co-channel and/or on an adjacent channel.

Loading at an access point (cell) may be determined (e.g., estimated) in various ways in accordance with the teachings herein. For example, cell load may be estimated based on one or more of: UMTS DL channelization code usage estimation by detecting used codes; HSDPA served user number estimation by detecting used F-DPCH slots; HSUPA served user number estimation by detecting used E-HICH/E-RGCH signatures; UMTS RACH load estimation by detecting used AICH slots; LTE DL time-frequency resource usage estimation by detecting used PDSCH resource; LTE PUSCH served user number estimation by detecting used PHICH codes; WiFi served user number estimation by decoding MAC addresses in intercepted packets; or Cell load information acquisition via mobile-to-mobile communications.

In view of the above, in some aspects, wireless communication in accordance with the teachings herein involves: receiving, at a first access point, signals from at least one other access point; determining, based on the received signals, loading at each of the at least one other access point; and transmitting an indication of the loading.

In addition, in some aspects, wireless communication in accordance with the teachings herein involves: receiving, at an access terminal, signals from an access point, wherein the access terminal is not connected to the access point; determining, based on the received signals, loading at the access point; and determining whether to initiate communication with the access point based on the loading.

BRIEF DESCRIPTION OF THE DRAWINGS

These and other sample aspects of the disclosure will be described in the detailed description and the claims that follow, and in the accompanying drawings, wherein:

Figure 1:
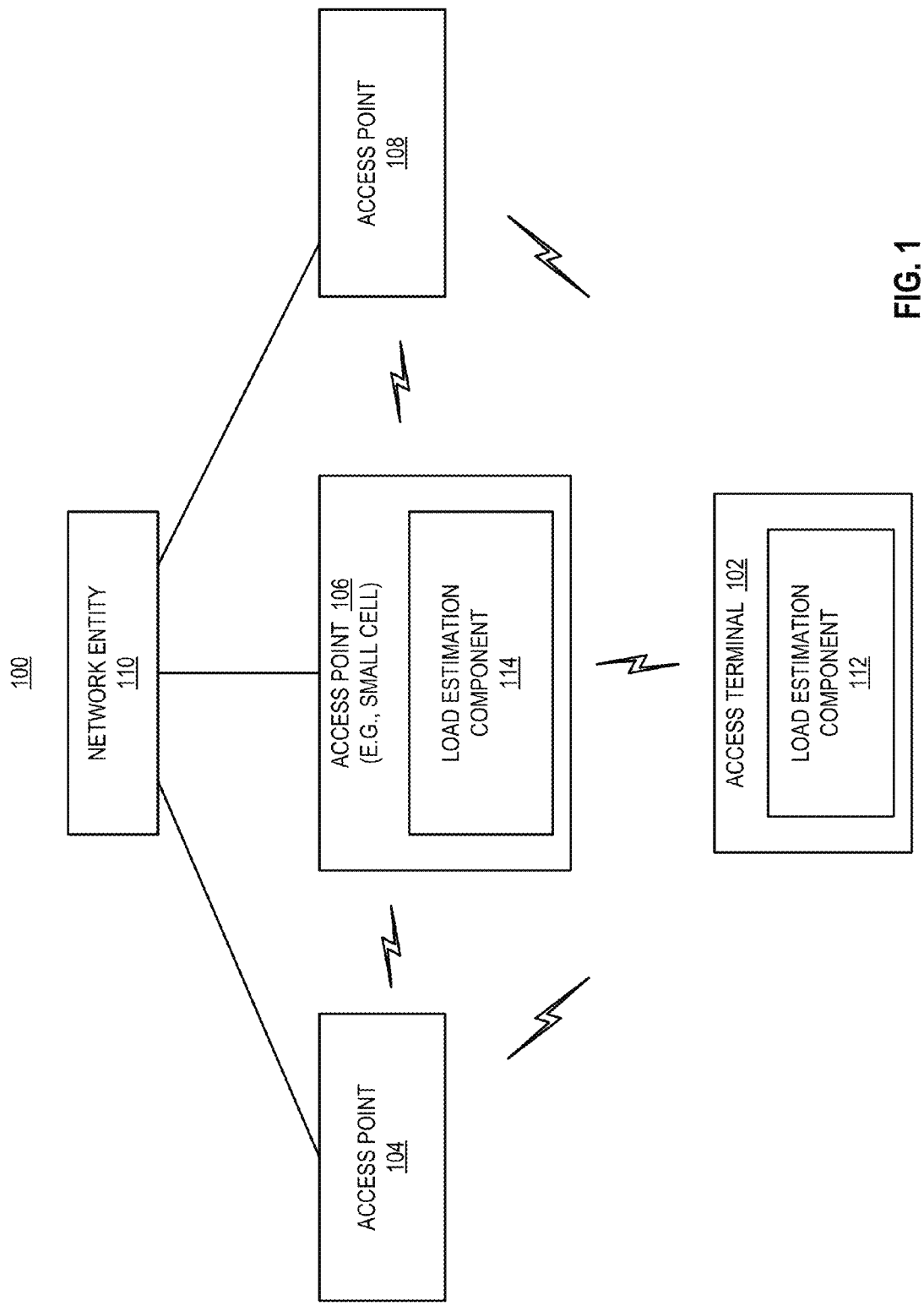
FIG. 1 is a simplified block diagram of several sample aspects of a communication system.

In accordance with common practice, the various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus (e.g., device) or method. Finally, like reference numerals may be used to denote like features throughout the specification and figures.

DETAILED DESCRIPTION

Various aspects of the disclosure are described below. It should be apparent that the teachings herein may be embodied in a wide variety of forms and that any specific structure, function, or both being disclosed herein is merely representative. Based on the teachings herein one skilled in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. Furthermore, an aspect may comprise at least one element of a claim.

FIG. 1 illustrates several nodes of a sample communication system 100 (e.g., a portion of a communication network). For illustration purposes, various aspects of the disclosure will be described in the context of one or more access terminals, access points, and network entities that communicate with one another. It should be appreciated, however, that the teachings herein may be applicable to other types of apparatuses or other similar apparatuses that are referenced using other terminology. For example, in various implementations access points may be referred to or implemented as base stations, NodeBs, eNodeBs, small cells, femtocells, and so on, while access terminals may be referred to or implemented as user equipment (UEs), mobile stations, and so on.

Access points in the system 100 provide access to one or more services (e.g., network connectivity) for one or more wireless terminals (e.g., an access terminal 102) that may be installed within or that may roam throughout a coverage area of the system 100. For example, at various points in time the access terminal 102 may connect to an access point 104, an access point 106, an access point 108, or some access point in the system 100 (not shown).

Each of these access points may communicate with one or more network entities (represented, for convenience, by a network entity 110) to facilitate wide area network connectivity. Two or more of these network entities may be co-located and/or two or more of these network entities may be distributed throughout a network.

The network entity 110 may take various forms such as, for example, one or more radio and/or core network entities. Thus, in various implementations the network entity 110 may represent functionality such as at least one of: network management (e.g., via an operation, administration, management, and provisioning entity), call control, session management, mobility management, gateway functions, interworking functions, or some other suitable network functionality. In some aspects, mobility management relates to: keeping track of the current location of access terminals through the use of tracking areas, location areas, routing areas, or some other suitable technique; controlling paging for access terminals; and providing access control for access terminals.

In some implementations, the access terminal 102 monitors for certain signals transmitted by neighboring access points (e.g., the access points 104 and 108) to determine (e.g., estimate) loading at the neighboring access points (e.g., at the cells of the access points). Based on these signals, the access terminal 102 (e.g., a load estimation component 112) determines whether to initiate communication (e.g., connect to) one of these access points.

Figure 2:
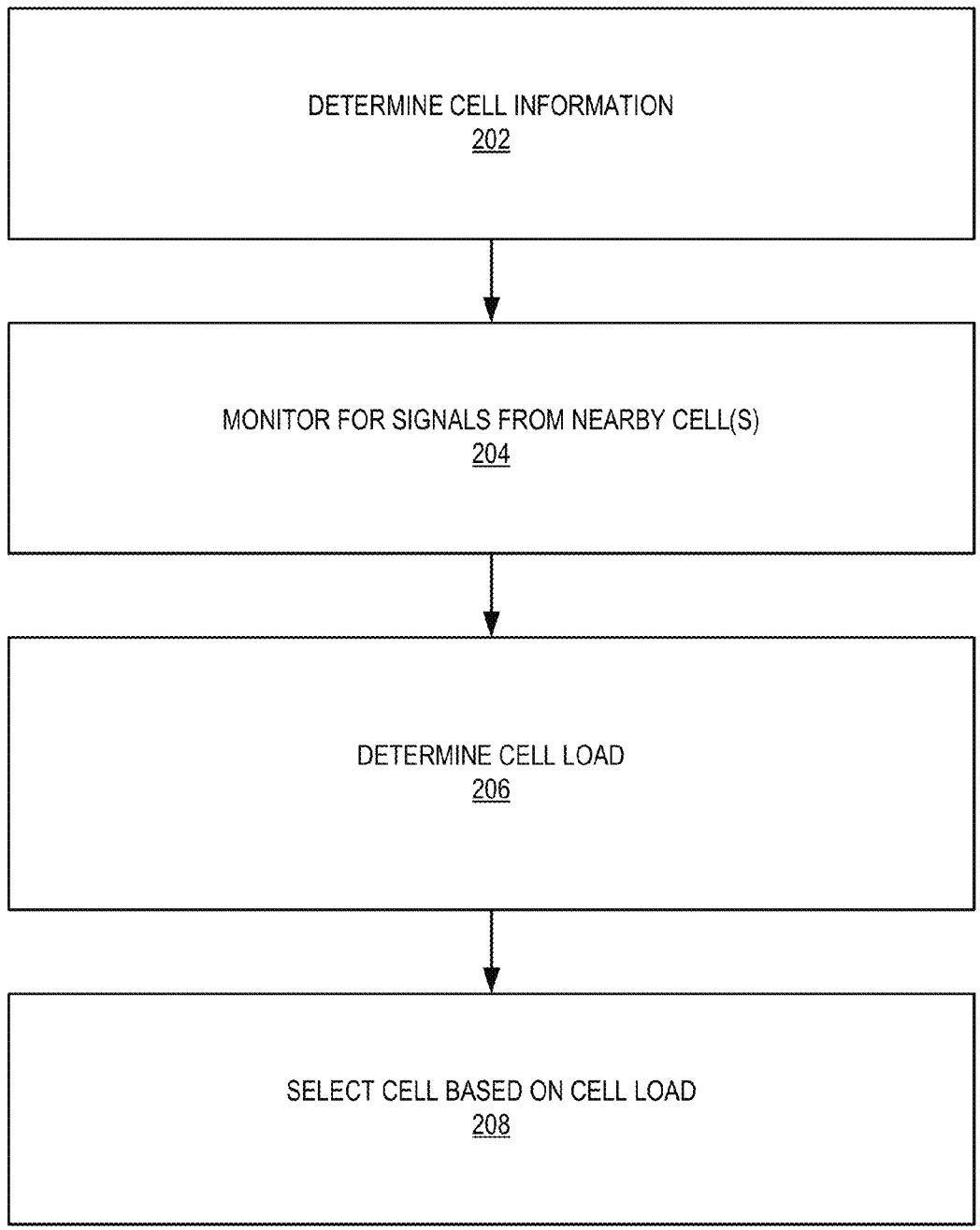
FIG. 2 is a flowchart of several sample aspects of operations that may be performed in conjunction with selecting a cell.

FIG. 2 illustrates an example of operations that may be employed in conjunction with such an access terminal-based load estimation scheme. For convenience, the operations of FIG. 2 (or any other operations discussed or taught herein) may be described as being performed by specific components (e.g., components of FIG. 1). It should be appreciated, however, that these operations may be performed by other types of components and may be performed using a different number of components. It also should be appreciated that one or more of the operations described herein may not be employed in a given implementation.

As represented by block 202, an access terminal determines cell information relating to any nearby cells to be monitored. As discussed below, the access terminal may use this cell information to determine how to acquire certain information transmitted by each cell that is indicative of load at the cell. As discussed above, the load-related information transmitted by a cell may be indicative of traffic load, the number of users served by the cell, and so on.

In some implementations, the access terminal monitors for signals from a specified set of cells (e.g., a neighbor list). In this case, for each cell of the set, the access terminal may monitor for information broadcast by these cells that specifies how the cell transmits the information that is indicative of load at the cell. For example, the broadcast information may specify the channels, the frames, and locations within those channels or frames at which the cell transmits the load-related information (i.e., information indicative of load at the cell).

In some implementations, the access terminal receives information as a result of establishing a connection with a cell. For example, during a connection setup procedure with a given cell, the access terminal may receive information that specifies how the cell transmits the load-related information.

In some implementations, the access terminal monitors for signals from all possible cells. In this case, the access terminal may, for example, periodically invoke a monitoring procedure whereby a different cell (or set of cells) is selected for monitoring at each invocation. The access terminal may then monitor for information broadcast by these cells that specifies how the cell transmits the load-related information.

As represented by block 204, at some point in time subsequent to the operations of block 202, the access terminal monitors for signals from one or more nearby cells. For example, an access terminal in idle mode may monitor for signals from nearby cells or an access terminal connected to a serving cell may monitor for signals from nearby cells other than the serving cell.

As discussed above, this monitoring may involve acquiring information transmitted by a cell on certain channels, in certain frames, or at certain locations. Accordingly, at this point, the access terminal has acquired the load-related information transmitted by each cell of interest.

In some implementations, the acquisition of this load-related information involves detecting the presence of a channelization code used by a cell. For example, detection of code presence may be based on whether a normalized correlation value (defined below) is above a threshold or not. Normalized correlation is given below in Equation 1, where vector a is the tested code sequence, b is a received sequence, H is a Hermitian operation, and ∥ is a norm operation:

$$\rho_t = \frac{|a_t^H b_t|}{\sqrt{a_t^H a_t} \sqrt{b_t^H b_t}}$$

The above value has a range between 0 and 1. Tested code presence can be announced if the above value>a threshold (e.g., 0.25). If a received sequence has the same code sequence repeated for multiple times, then the above value is computed for each code sequence and is further averaged over all repeated code sequences.

In some implementations, the acquisition of load-related information involves correlating received signals with tone information. For example, in an LTE-based system, to test if a signal presents on a tone within an OFDM symbol, the received signal samples in time can be correlated with the tone sinusoid sequence to compute the above correlation value.

As represented by block 206 of FIG. 2, the access terminal determines (e.g., estimates) cell load information based on the signals received from each nearby cell at block 204. For example, for each cell, the access terminal may estimate traffic load or user load at the cell based on the acquired load-related information.

As represented by block 208, the access terminal selects a cell based on the cell load information determined at block 206. For example, in a situation where the access terminal has acquired information from multiple cells, the access terminal may identify the cell with the lowest load, and select that cell. As another example, in a situation where the access terminal has acquired information from a single cell, the access terminal may determine whether that cell has sufficiently low loading. If so, the access terminal may simply select that cell.

Referring again to FIG. 1, in some implementations, the access point 106 (e.g., a low-power access point) may monitor signals transmitted by neighboring access points (e.g., the access points 104 and 106) and take action based on these signals. For example, the access point 106 (e.g., a load estimation component 114) may process received signals to determine (e.g., estimate) loading at the neighboring access points (e.g., at the cells of the access points). The access point 106 may then transmit (e.g., broadcast) an indication of this loading and/or redirect access terminals to one of these access points depending on the loading at each access point.

In some networks, low-power access points are deployed to supplement conventional network access points (e.g., macro access points). In general, these low-power access points provide more robust coverage and higher throughput for access terminals in the vicinity of the low-power access points. For example, a low-power access point installed in a user's home or in an enterprise environment (e.g., commercial buildings) may provide voice and high speed data service for access terminals supporting cellular radio communication (e.g., CDMA, WCDMA, UMTS, LTE, etc.). Typically, low-power access points connect to the Internet via a broadband connection (e.g., a digital subscriber line (DSL) router, a cable modem, or some other type of modem) that provides a backhaul link to a mobile operator's network.

As used herein, the term low-power access point refers to an access point having a transmit power (e.g., one or more of: maximum transmit power, instantaneous transmit power, nominal transmit power, average transmit power, or some other form of transmit power) that is less than a transmit power (e.g., as defined above) of any macro access point in a coverage area, or less than the nominal maximum transmit power (e.g. 46 dBm) that might be used for a macro access point that would cover a similar area as a set of multiple low-power access points. In some embodiments, each low-power access point has a transmit power (e.g., as defined above) that is less than a transmit power (e.g., as defined above) of the macro access point by a relative margin (e.g., 10 dB or more). In some embodiments, low-power access points such as femtocells may have a maximum transmit power of 20 dBm or less. In some embodiments, low-power access points such as picocells may have a maximum transmit power of 24 dBm or less. It should be appreciated, however, that these or other types of low-power access points may have a higher or lower maximum transmit power in other embodiments (e.g., up to 1 Watt in some cases, up to 10 Watts in some cases, and so on).

In different deployments, low-power access points may be implemented as or referred to as femtocells, femto access points, femto nodes, home NodeBs (HNBs), home eNodeBs (HeNBs), access point base stations, picocells, pico nodes, or microcells. For convenience, a low-power access point may be referred to simply as a "small cell" or a femtocell in the discussion that follows. Thus, it should be appreciated that any discussion related to small cells or femtocells herein may be equally applicable to low-power access points in general (e.g., to HNBs, HeNBs, picocells, microcells, etc.).

Figure 3:
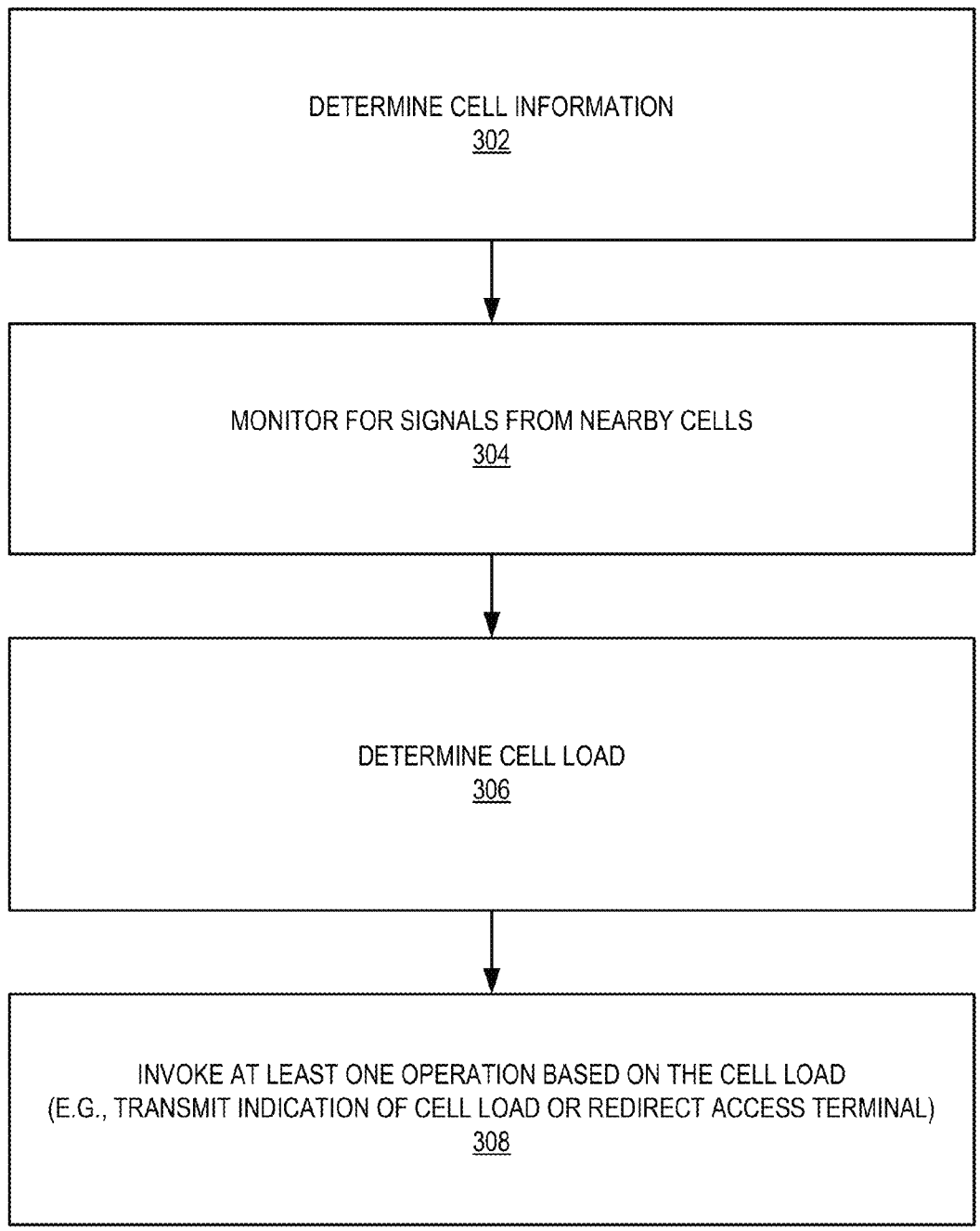
FIG. 3 is a flowchart of several sample aspects of operations that may be performed in conjunction with invoking an operation based on cell load.

FIG. 3 illustrates an example of operations that may be employed in conjunction with an access point-based load estimation scheme. In a typical implementation, the signal acquisition is performed by a network listen module (or other similar component) of a small cell. It should be appreciated, however, that the operations of FIG. 3 may be implemented by different types of entities in different implementations.

As represented by block 302, an access point determines cell information relating to any nearby cells to be monitored. In some aspects, this operation is similar to the operation of block 202 discussed above in that similar information may be acquired. In this case, however, an access point may employ a network listen module to listen for downlink signals transmitted by nearby cells.

As represented by block 304, at some point in time subsequent to the operations of block 302, the access point monitors for signals from nearby cells. This operation is similar to the operation of block 204 discussed above in that similar information may be acquired, albeit by a network listen module.

As represented by block 306, the access point determines the loading at each cell. This operation is similar to the operation of block 206 discussed above in that similar techniques may be used to determine cell load.

As represented by block 308, the access point invokes an appropriate action based on the cell load determined at block 306.

In some implementations, the access point transmits (e.g., broadcasts on a broadcast channel) an indication of the determined cell load. For example, this indication may indicate the load at each cell. Alternatively, this indication may simply identify the best cell (e.g., by indicating the loading at the lowest loaded cell).

In some implementations, the access point redirects any nearby access terminal to the best cell identified by the access point. For example, a small cell may redirect small cell users to lightly loaded neighboring cells on a co-channel and/or on an adjacent channel.

With the above overview in mind, several examples of techniques that may be employed to estimate cell load will now be described in more detail. For purposes of explanation, these examples are described in the context of a UE in idle mode that acquires information from a nearby UMTS or LTE cell and estimates the load on that cell. It should be understood, however, that these operations or similar operations may be performed by an access terminal in some other operational mode or by some other entity (e.g., an access point with a network listen module), and that similar operations may be performed using other radio access technologies.

UMTS DL Channelization Code Usage Estimation by Detecting Used Codes

An idle UE may estimate a UMTS cell's DL channelization code usage by detecting the number of used channelization codes. The UE may elect to not access this cell if the code usage exceeds a threshold. The threshold may be a predetermined threshold. The estimation may employ the two part procedure that follows.

In the first part of the procedure, the idle UE determines whether a channelization code is used. An example of a three step process for making this determination follows. First, the UE receives a sequence of symbols in the downlink (DL) from the cell (256 chips per symbol). Second, the UE despreads the symbol sequence with the considered channelization code. Third, the UE determines that the code is used if a normalized correlation value associated with the despreaded symbols exceeds a threshold.

In the second part of the procedure, the UE estimates the cell's DL code usage based on Equation 2:

$$\text{Code\_usage} = \sum_x N(SFx) \frac{1}{x}$$

Here, N(SFx) is the number of used codes with spreading factor x, which may be 4, 8, 16, etc. For example, if the UE detects one (1) SF4 code used and eight (8) SF16 codes used, the code usage will be $1*\frac{1}{4}+8*\frac{1}{16}=0.75$. The code usage may represent a fraction of total code usage. In this example, three quarters (75%) of the total code space is used.

HSDPA Served User Number Estimation by Detecting Used F-DPCH Slots

Figure 4:
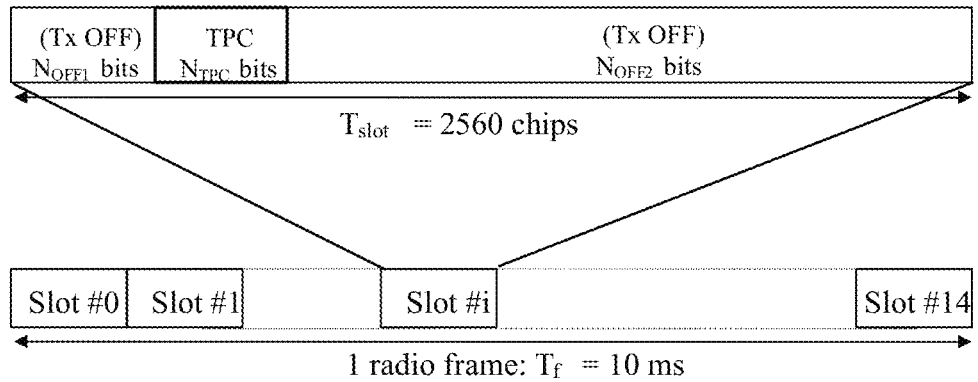
FIG. 4 illustrates a structure of a fractional dedicated physical channel (F-DPCH)

An idle UE may estimate an HSDPA cell's served user number by detecting the number of used F-DPCH slots. FIG. 4 illustrates a structure of a fractional dedicated physical channel (F-DPCH). The UE may elect to not access this cell if the HSDPA user number exceeds a threshold. The estimation may employ the three part procedure that follows.

In the first part of the procedure, the UE initially learns the F-DPCH channelization codes used by this cell based on receiving a broadcast message with a system information block 5 (SIB5) reading (Common E-DCH system information→F-DPCH Code number) or the UE's previous HSDPA connection experience with this cell. In the latter case, upon HSDPA connection setup, the cell will inform the UE which channelization code to monitor for F-DPCH, and the UE may maintain a record of the channelization code.

In the second part of the procedure, the UE despreads each F-DPCH with the corresponding channelization code, and further estimates the number of used slots per F-DPCH frame. As shown in FIG. 4, each F-DPCH frame has 15 slots, which can be used to periodically transmit power control bits for up to 15 HSDPA users. One F-DPCH slot is deemed to be used if a normalized correlation value associated with the despreaded symbols within that slot exceeds a threshold.

In the third part of the procedure, the UE estimates the HSDPA user number by summing the used slot number per frame across all F-DPCHs.

HSUPA Served User Number Estimation by Detecting Used E-HICH/E-RGCH Signatures

Figure 5:
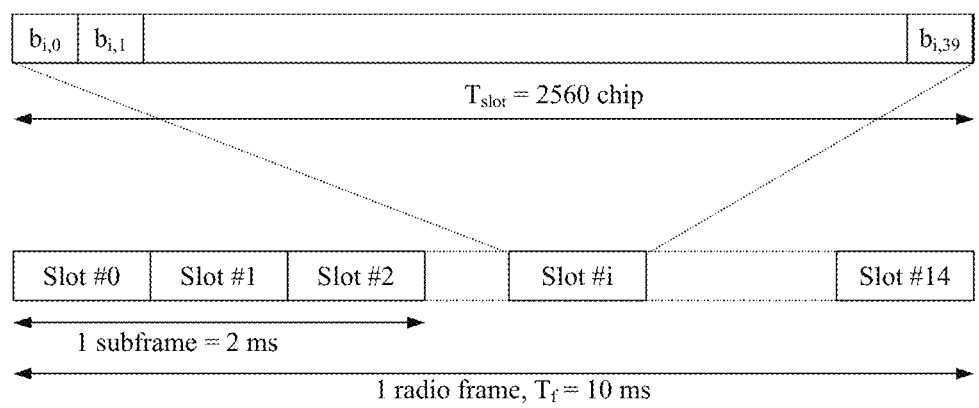
FIG. 5 illustrates a structure of an E-DCH Relative Grant Channel (E-RGCH) and an E-DCH Hybrid ARQ Indicator Channel (E-HICH)

An idle UE can estimate a HSUPA cell's served user number by detecting the number of used E-HICH/E-RGCH signatures. FIG. 5 illustrates a structure of an E-DCH Relative Grant Channel (E-RGCH) and an E-DCH Hybrid ARQ Indicator Channel (E-HICH). The UE may elect to not access this cell if HSUPA user number exceeds a threshold. The estimation may employ the four part procedure that follows.

In the first part of the procedure, the UE initially learns the E-HICH/E-RGCH channelization codes used by this cell based on SIB5 reading (Common E-DCH system information→E-HICH/E-RGCH information) or its previous HSUPA connection experience with this cell. In the latter case, upon HSUPA connection setup, the cell will inform UE which channelization code to monitor for E-HICH/E-RGCH, and UE can maintain a record of this code.

In the second part of the procedure, the UE despreads each E-HICH/E-RGCH with the corresponding channelization code, and further estimates the number of used signatures per subframe. As shown in FIG. 5, each subframe may carry at most 40 signatures. Each signature may periodically transmit either E-HICH or E-RGCH information for one HSUPA user. The UE determines that one signature is used if a normalized correlation value associated with the signature exceeds a threshold.

In the third part of the procedure, the UE classifies each used signature based on its carried information obtained via correlation detection over multiple subframes. If the information has both +1 and −1, the signature is used as E-RGCH or E-HICH for a serving HSUPA user. If the information has +1 and 0, the signature is used as E-HICH for a non-serving HSUPA user in soft handover.

In the fourth part of the procedure, the UE estimates the total HSUPA user number as indicated in Equation 3:

$$\text{HSUPA\_user\_\#} = \frac{\text{\# of signatures for serving users}}{2} + \text{\# of signatures for non-serving users}$$

Here, the division by 2 is because each serving HSUPA user is allocated with 2 signatures for its E-HICH and E-RGCH, while each non-serving HSUPA user in soft handover is only allocated with 1 signature for E-HICH.

UMTS RACH Load Estimation by Detecting Used AICH Slots

Figure 6:
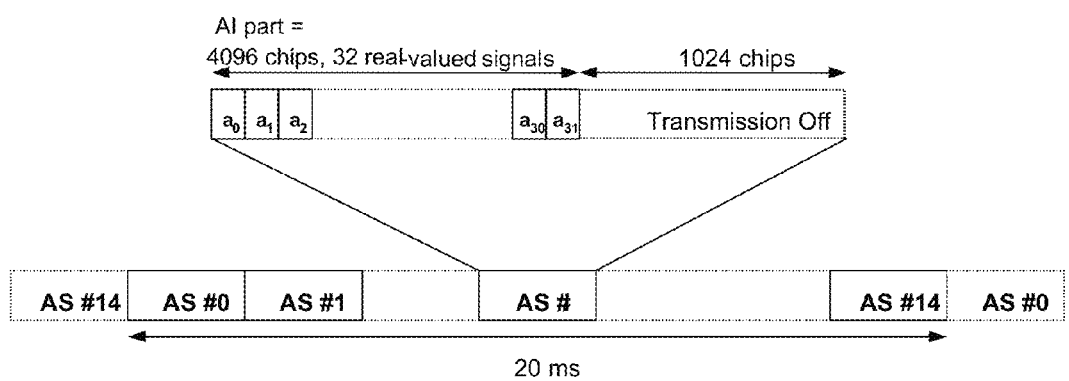
FIG. 6 illustrates a structure of an Acquisition Indicator Channel (AICH)

An idle UE may estimate a UMTS cell's RACH load by detecting the number of used Acquisition Indicator Channel (AICH) slots. FIG. 6 illustrates a structure of an AICH. The UE may elect to not access this cell if the RACH load exceeds a threshold. The estimation may employ the three part procedure that follows.

In the first part of the procedure, the idle UE learns the AICH channelization code used by this cell based on an SIB5 reading (PRACH system information list→AICH information).

In the second part of the procedure, the UE despreads AICH with the corresponding channelization code, and further estimates the number of used slots per AICH frame. As shown in FIG. 6, each AICH frame has 15 slots. Each slot may be used to transmit a RACH response for a received RACH signature. Therefore, the percentage of used AICH slots may reflect the RACH load. One AICH slot is deemed used if a normalized correlation value associated with the AICH slot exceeds a threshold.

In the third part of the procedure, the UE estimates RACH load by looking at the percentage of used AICH slots over a certain number of AICH slots.

Figure 7:
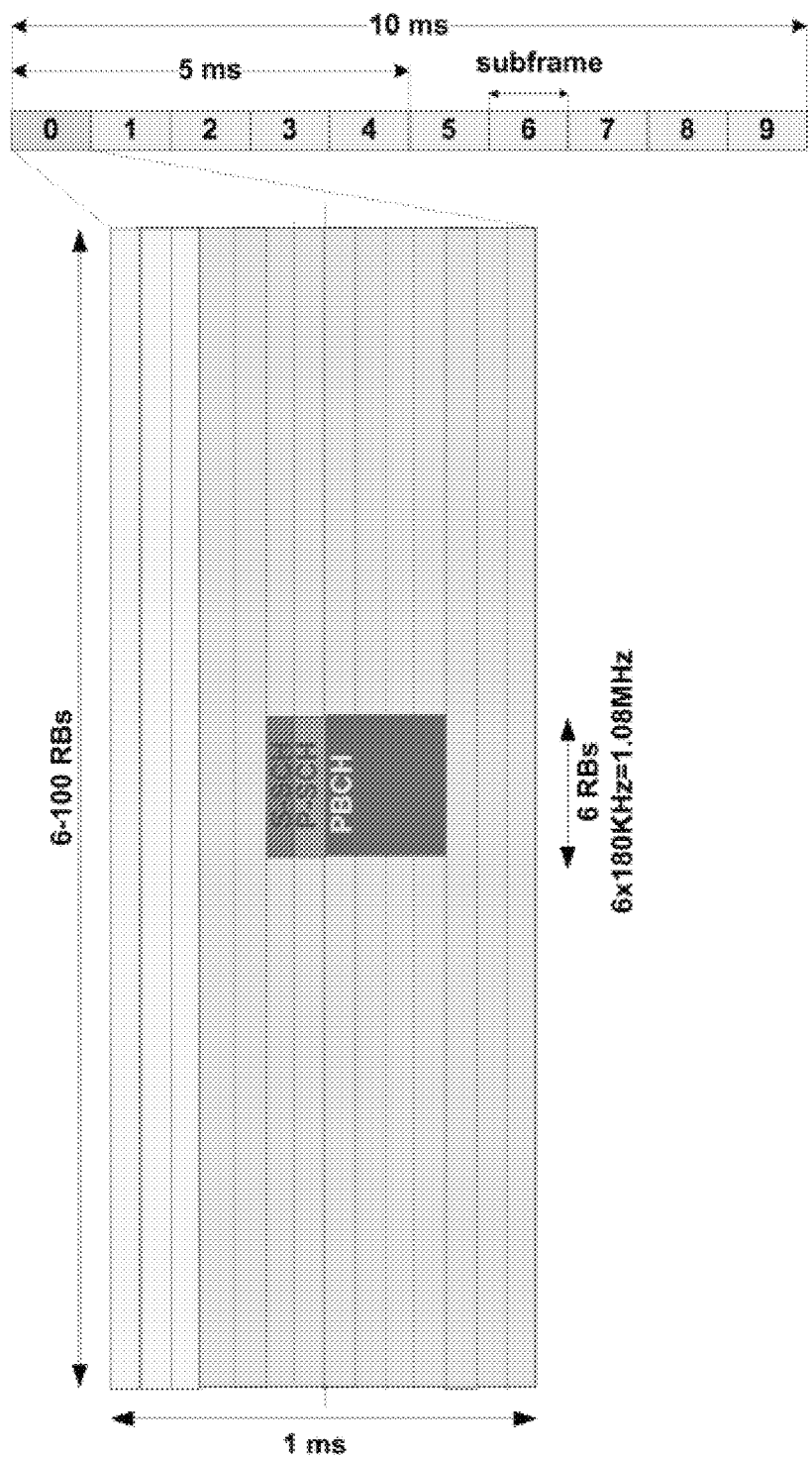
FIG. 7 illustrates example locations for a Physical Downlink Shared Channel (PDSCH)

LTE DL Time-Frequency Resource Usage Estimation by Detecting Used PDSCH Resource An idle UE may estimate an LTE cell's DL time-frequency resource usage by detecting the used PDSCH resource. FIG. 7 illustrates example locations for a Physical Downlink Shared Channel (PDSCH). The UE may elect to not access this cell if the DL resource usage exceeds a threshold. The estimation may employ the three part procedure that follows.

In the first part of the procedure, the idle UE learns the cell's possible PDSCH resource element locations (see hatch pattern portion in FIG. 7) by reading the broadcast information or its previous connection experience with this cell. Upon connection setup, the cell will inform UE which resource elements to monitor for PDSCH.

In the second part of the procedure, the UE checks if a PDSCH resource element is used. A two step process for performing this check follows. First, the UE receives a sequence of OFDM symbols in the DL from the cell and performs DFT. Second, a PDSCH resource element is deemed to be used if a normalized correlation value associated with the corresponding subcarrier and OFDM symbol exceeds a threshold.

In the third part of the procedure, the UE estimates the DL time-frequency resource usage by looking at the percentage of used PDSCH resource elements.

LTE PUSCH Served User Number Estimation by Detecting Used PHICH Codes

Figure 8:
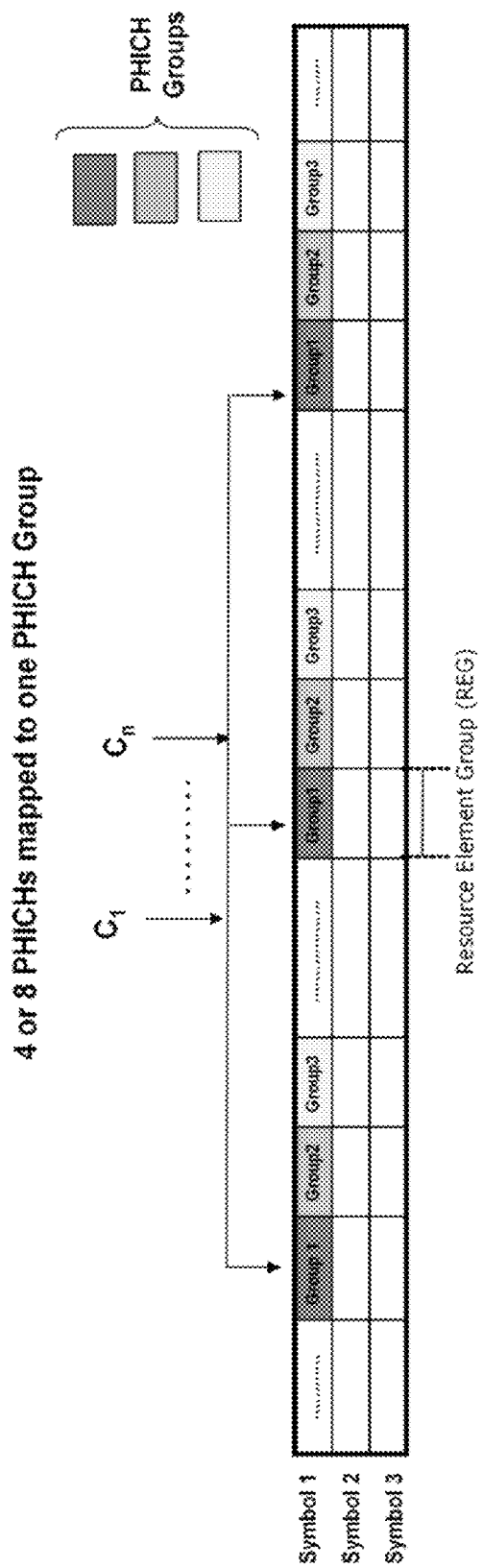
FIG. 8 illustrates a structure of Physical Hybrid ARQ Indication Channel (PHICH)

An idle UE can estimate a LTE cell's PUSCH user number by detecting the number of used Physical Hybrid ARQ Indication Channel (PHICH) orthogonal codes. FIG. 8 illustrates a structure of the PHICH. The UE may elect to not access this cell if the PUSCH user number exceeds a threshold. The estimation may employ the three part procedure that follows.

In the first part of the procedure, the idle UE learns the PHICH group number, the location per group, and the maximum code number per group of this cell based on cell broadcast information or its previous connection experience with this cell.

In the second part of the procedure, for each PHICH group, the UE estimates the number of used PHICH codes. As shown in FIG. 8, each PHICH group may support a maximum of 4 or 8 PUSCH users, separated by orthogonal codes. The UE may determine that one PHICH code is used if a normalized correlation value associated with the PHICH code exceeds a threshold.

In the second part of the procedure, the UE estimates the PUSCH user number by summing the used PHICH code number across all PHICH groups.

WiFi Served User Number Estimation by Decoding MAC Addresses in Intercepted Packets In yet another aspect, an idle UE may estimate a WiFi access point's served user number based on the source/destination MAC addresses in the intercepted packets. The UE may determine not to access an access point if the access point's served user number exceeds a threshold. The estimation may employ the four part procedure that follows.

In the first part of the procedure, the idle UE learns the access point's MAC address based on the access point's beacon broadcast or its previous connection experience with this access point. In the latter case, in each data packet received from this access point, the access point's MAC address is the source MAC address in the MAC header, and the UE may memorize it.

In the second part of the procedure, the UE intercepts data packets exchanged between this access point and its served UEs, and decodes source/destination MAC addresses in each packet.

In the third part of the procedure, the UE estimates the DL served user number by counting the number of different destination MAC addresses in intercepted packets with source MAC address matching the access point's MAC address.

In the fourth part of the procedure, the UE estimates the UL served user number by counting the number of different source MAC addresses in intercepted packets with the destination MAC address matching the access point's MAC address.

Cell Load Information Acquisition Via Mobile-to-Mobile Communications

An idle UE may acquire cell load information for a cell by requesting this information from other UEs currently connected to that cell. The acquisition of cell load information between the idle UE and other UEs may be communicated via mobile-to-mobile communication links. The cell load information may include the current user throughput, various resource usages, served user number, etc., as observed by connected UEs.

For each of the above techniques, a cell may be able to detect a UE performing the technique. For example, the cell may vary its resource usage to see if the UE switches to another cell to request a connection.

With the above in mind, additional examples of operations relating to determining loading at one or more access points (e.g., determining loading of cells of the access point(s)) and taking action thereon will now be described in more detail in conjunction with the flowcharts of FIGS. 9 and 10.

Figure 9:
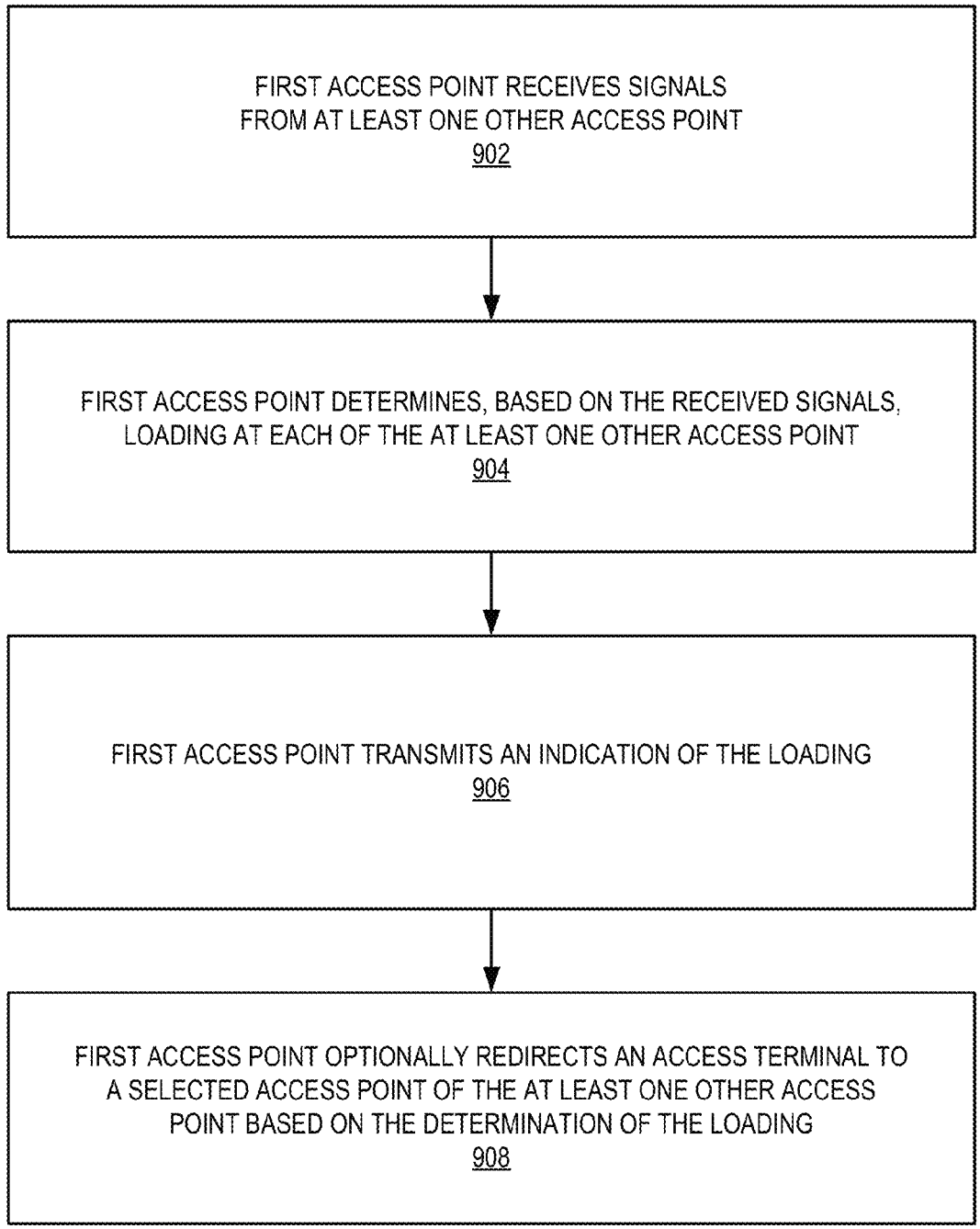
FIG. 9 is a flowchart of several sample aspects of operations that may be performed in conjunction with transmitting an indication of access point load.

FIG. 9 describes operations that may be performed to acquire load information and transmit an indication of the load information. For purposes of illustration, the operations of FIG. 9 are described as being performed by an access point. It should be appreciated, however, that these operations may be performed by different types of entities in different implementations.

As represented by block 902, a first access point receives signals from at least one other access point. For example, the signals may be received by a network listen module of the first access point.

As discussed herein, the received signals may comprise one or more of: at least one downlink channelization code, a symbol sequence transmitted on a UMTS downlink channel, symbols transmitted in an AICH frame, or a sequence of OFDM symbols transmitted in a Physical Downlink Shared Channel (PDSCH).

Also as discussed herein, the received signals may be indicative of a quantity of users served by one or more access points. For example, the received signals may comprise one or more of: symbols transmitted in an F-DPCH frame, symbols transmitted in an E-RGCH frame, symbols transmitted in an E-HICH frame, or signals associated with at least one PHICH group.

As represented by block 904, loading at each of the at least one other access point is determined based on signals received at block 902. The loading may comprise one or more of: traffic load, user load, or some other type of load. In some implementations, the determination of the loading is based on at least one downlink channelization code. In some implementations, the determination of the loading is based on the quantity of users served.

As discussed herein, the determination of the loading may comprise determining, based on a symbol sequence, a change (e.g., an increase or a decrease) in a quantity of downlink channelization codes used by the particular access point, and determining, based on the change in the quantity of downlink channelization codes used by the particular access point, that traffic load at the particular access point has changed (e.g., increased or decreased) in a corresponding manner. For example, an increase in the quantity of codes used may indicate a corresponding (e.g., proportional) increase in the traffic load. Conversely, a decrease in the quantity of codes used may indicate a corresponding decrease in the traffic load. Here, a determination of whether a particular downlink channelization code is used comprises determining whether a normalized correlation value resulting from dispreading of the symbol sequence, according to the particular downlink channelization code, exceeds a threshold.

As discussed herein, the determination of the loading may comprise determining, based on the symbols, a change (e.g., increase or decrease) in a quantity of slots used in the AICH frame, and determining, based on the change in the quantity of slots used, that RACH load at the particular access point has changed (e.g., increased or decreased) in a corresponding manner. For example, an increase in the quantity of slots used may indicate a corresponding (e.g., proportional) increase in the traffic load. Conversely, a decrease in the quantity of slots used may indicate a corresponding decrease in the traffic load. Here, a determination of whether a particular slot is used comprises determining whether a normalized correlation value resulting from dispreading of the symbols associated with the particular slot, according to a channelization code for the AICH frame, exceeds a threshold.

As discussed herein, the determination of the loading may comprise determining, based on the sequence of OFDM symbols, a change (e.g., an increase or decrease) in a quantity of LTE PDSCH resource elements used by the particular access point, and determining, based on the change in the quantity of LTE PDSCH resource elements used, that time-frequency resource usage at the particular access point has changed (e.g., increased or decreased) in a corresponding manner. For example, an increase in the quantity of resource elements used may indicate a corresponding (e.g., proportional) increase in the traffic load. Conversely, a decrease in the quantity of resource elements used may indicate a corresponding decrease in the traffic load. Here, a determination of whether a particular LTE PDSCH resource element is used comprises performing DFT on the sequence of OFDM symbols and determining whether a resulting normalized correlation value associated with a subcarrier and an OFDM symbol of the particular LTE PDSCH resource element exceeds a threshold.

As discussed herein, the determination of the loading may comprise determining, based on the symbols, a quantity of slots used in the F-DPCH frame, determining, based on the quantity of slots used, a change (e.g., increase or decrease) in a quantity of UMTS HSDPA users served by the particular access point, and determining, based on the change in the quantity of served UMTS HSDPA users, that user load at the particular access point has changed (e.g., increased or decreased) in a corresponding manner. For example, an increase in the quantity of users served may indicate a corresponding (e.g., proportional) increase in the traffic load. Conversely, a decrease in the quantity of users served may indicate a corresponding decrease in the traffic load. Here, a determination of whether a particular slot is used comprises determining whether a normalized correlation value resulting from dispreading of the symbols associated with the particular slot, according to a channelization code for the F-DPCH frame, exceeds a threshold.

As discussed herein, the determination of the loading may comprise determining, based on the symbols, a quantity of used signatures per subframe in the E-RGCH frame and/or the E-HICH frame, and determining, based on the quantity of used signatures, a change (e.g., increase or decrease) in a quantity of UMTS HSUPA users served by the particular access point, and determining, based on the change in the quantity of served UMTS HSUPA users, that user load at the particular access point has changed (e.g., increased or decreased) in a corresponding manner. For example, an increase in the quantity of used signatures may indicate a corresponding (e.g., proportional) increase in the traffic load. Conversely, a decrease in the quantity of used signatures may indicate a corresponding decrease in the traffic load. Here, a determination of whether a particular signature of a particular subframe is used comprises determining whether a normalized correlation value resulting from dispreading of the symbols associated with the particular subframe, according to at least one channelization code for the E-RGCH frame and/or the E-HICH frame, exceeds a threshold.

As discussed herein, the determination of the loading may comprise determining based on the signals, for each PHICH group of the at least one PHICH group, a quantity of PHICH codes used in the PHICH group, determining, based on the quantity of PHICH codes used in the at least one PHICH group, a change (e.g., increase or decrease) in a quantity of LTE PUSCH users served by the particular access point, and determining, based on the change in the quantity of served LTE PUSCH users, that user load at the particular access point has changed (e.g., increased or decreased) in a corresponding manner. For example, an increase in the quantity of codes used may indicate a corresponding (e.g., proportional) increase in the traffic load. Conversely, a decrease in the quantity of codes used may indicate a corresponding decrease in the traffic load. Here, a determination of whether a particular PHICH code is used comprises determining whether a normalized correlation value resulting from dispreading of the signals, according to the particular PHICH code, exceeds a threshold.

As represented by block 906, the first access point transmits an indication of the loading. For example, the first access point may broadcast the indication on a broadcast channel.

As represented by block 908, the first access point may optionally redirecting redirect an access terminal to a selected access point of the at least one other access point based on the determination of the loading at block 904.

Figure 10:
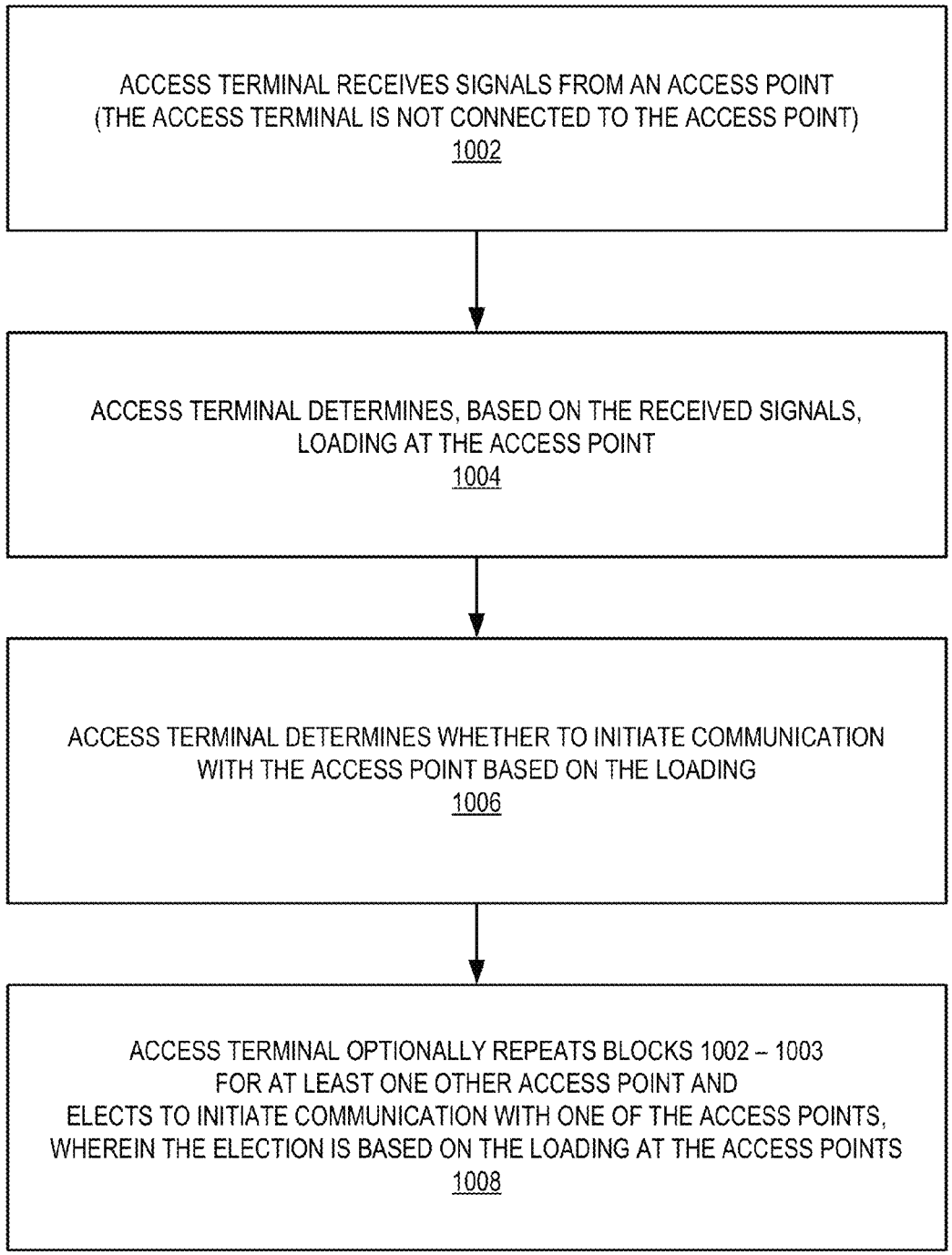
FIG. 10 is a flowchart of several sample aspects of operations that may be performed in conjunction with determining whether to initiate communication with an access point.

FIG. 10 describes operations that may be performed to acquire load information and determine, based on the load information, whether to initiate communication with an access point. For purposes of illustration, the operations of FIG. 10 are described as being performed by an access terminal. It should be appreciated, however, that these operations may be performed by different types of entities in different implementations.

As represented by block 1002, an access terminal receives signals from an access point to which the access terminal is not connected. For example, the access terminal may be in idle mode during the reception of the signals or the access terminal may be connected to another access point during the reception of the signals. The signals received at block 1002 may be similar to the signals received at block 902. Thus, these characteristics of the signals will not be repeated.

As represented by block 1004, loading at the access point is determined based on signals received at block 1002. The type of loading and the determination of the loading at block 1002 may be similar to the type of loading and the determination of the loading discussed at block 902. Thus, a discussion of these operations and loading types will not be repeated.

As represented by block 1006, the access terminal determines whether to initiate communication with the access point based on the loading determined at block 1004. For example, the access terminal may determine whether to reselect to the access or whether to connect to the access point. In some aspects, the determination of whether to initiate communication comprises comparing the loading to a threshold.

As represented by block 1008, the operations of block 1002-1006 may optionally be repeated to determine the loading at other access points. The access terminal may then elect to initiate communication with one of the access points, wherein the election is based on the loading at the access points. For example, the access terminal may connect to the access point with the lowest load.

Figure 11:
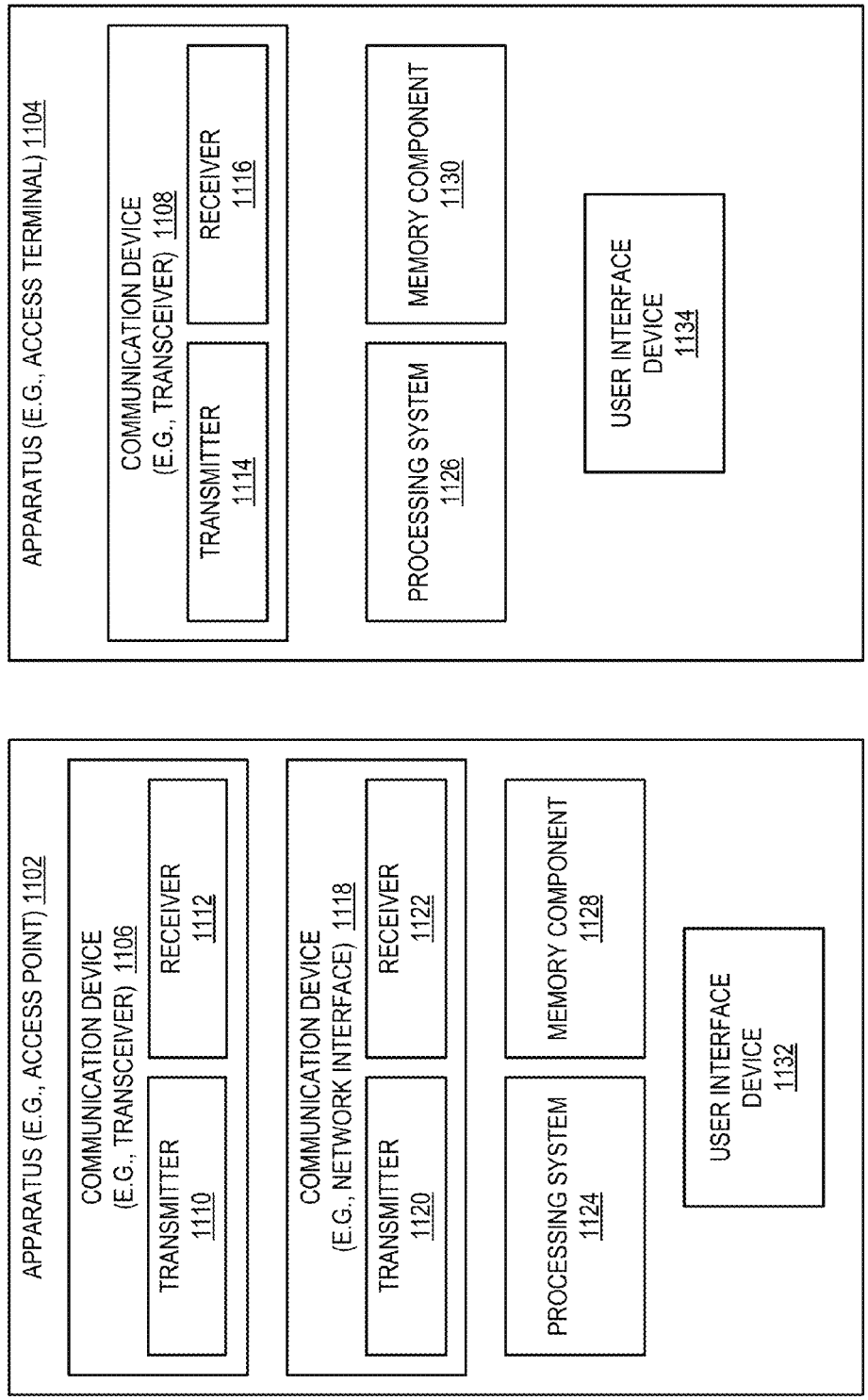
FIG. 11 is a simplified block diagram of several sample aspects of components that may be employed in communication nodes.

FIG. 11 illustrates several sample components (represented by corresponding blocks) that may be incorporated into an apparatus 1102 and an apparatus 1104 (e.g., corresponding to the access point 106 and the access terminal 102 of FIG. 1, respectively) to perform load-related operations as taught herein. It should be appreciated that these components may be implemented in different types of apparatuses in different implementations (e.g., in an ASIC, in a system on a chip (SoC), etc.). The described components also may be incorporated into other apparatuses in a communication system. For example, other apparatuses in a system may include components similar to those described for the apparatus 1102 to provide similar functionality. Also, a given apparatus may contain one or more of the described components. For example, an apparatus may include multiple transceiver components that enable the apparatus to operate on multiple carriers and/or communicate via different technologies.

The apparatus 1102 and the apparatus 1104 each include at least one wireless communication device (represented by the communication devices 1106 and 1108, respectively) for communicating with other nodes via at least one designated radio access technology. Each communication device 1106 includes at least one transmitter (represented by the transmitter 1110) for sending signals (e.g., messages, indications, information, pilots, downlink signal, and so on) and at least one receiver (represented by the receiver 1112) for receiving signals (e.g., messages, indications, information, uplink signals, and so on). Similarly, each communication device 1108 includes at least one transmitter (represented by the transmitter 1114) for sending signals (e.g., messages, indications, information, uplink signals, and so on) and at least one receiver (represented by the receiver 1116) for receiving signals (e.g., messages, indications, information, pilots, downlink signals, and so on). In some aspects, a wireless communication device (e.g., one of multiple wireless communication devices) of the apparatus 1102 comprises a network listen module.

A transmitter and a receiver may be implemented in various ways. For example, a transmitter and a receiver may comprise an integrated device (e.g., embodied as a transmitter circuit and a receiver circuit of a single communication device) in some implementations, may comprise a separate transmitter device and a separate receiver device in some implementations, or may be embodied in other ways in other implementations.

The apparatus 1102 includes at least one communication device (represented by the communication device 1118) for communicating with other nodes. For example, the communication device 1118 may comprise a network interface that is configured to communicate with one or more network entities via a wire-based or wireless backhaul. In some aspects, the communication device 1118 may be implemented as a transceiver configured to support wire-based or wireless signal communication. This communication may involve, for example, sending and receiving: messages, parameters, or other types of information. Accordingly, in the example of FIG. 11, the communication device 1118 is shown as comprising a transmitter 1120 and a receiver 1122.

The apparatus 1102 and the apparatus 1104 also include other components that may be used in conjunction with load-related operations as taught herein. The apparatus 1102 includes a processing system 1124 for providing functionality relating to determining load and taking action thereon, and for providing other processing functionality. For example, the processing system 1124 may perform at least one of: determining, based on received signals, loading at each of at least one other access point; or redirecting an access terminal to a selected access point of the at least one other access point based on the determination of the loading. In addition, the apparatus 1104 includes a processing system 1126 for providing functionality relating to determining load and taking action thereon, and for providing other processing functionality. For example, the processing system 1126 may perform at least one of: determining, based on the received signals, loading at an access point; determining whether to initiate communication with the access point based on the loading; or electing to initiate communication with one of a plurality of access points, wherein the election is based on the loading at the access points. The apparatus 1102 and the apparatus 1104 include memory components 1128 and 1130 (e.g., each including a memory device), respectively, for maintaining information (e.g., information, thresholds, parameters, and so on). In addition, the apparatus 1102 and the apparatus 1104 include user interface devices 1132 and 1134, respectively, for providing indications (e.g., audible and/or visual indications) to a user and/or for receiving user input (e.g., upon user actuation of a sensing device such a keypad, a touch screen, a microphone, and so on).

For convenience, the apparatus 1102 is shown in FIG. 11 as including components that may be used in the various examples described herein. In practice, the illustrated blocks may have different functionality in different aspects. For example, the functionality of the block 1124 for performing operations relating to FIG. 4 may be different as compared to the functionality for performing operations relating to FIG. 5.

The components of FIG. 11 may be implemented in various ways. In some implementations, the components of FIG. 11 may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 1106, 1118, 1124, 1128, and 1132 may be implemented by processor and memory component(s) of the apparatus 1102 (e.g., by execution of appropriate code and/or by appropriate configuration of processor components). Similarly, some or all of the functionality represented by blocks 1108, 1126, 1130, and 1134 may be implemented by processor and memory component(s) of the apparatus 1106 (e.g., by execution of appropriate code and/or by appropriate configuration of processor components).

As discussed above, the teachings herein are employed in a network that includes macro scale coverage (e.g., a large area cellular network such as a 3G network, typically referred to as a macro cell network or a WAN) and smaller scale coverage (e.g., a residence-based or building-based network environment, typically referred to as a LAN). As an access terminal (AT) moves through such a network, the access terminal may be served in certain locations by access points that provide macro coverage while the access terminal may be served at other locations by access points that provide smaller scale coverage. In some aspects, the smaller coverage nodes may be used to provide incremental capacity growth, in-building coverage, and different services (e.g., for a more robust user experience).

In the description herein, a node (e.g., an access point) that provides coverage over a relatively large area may be referred to as a macrocell while a node that provides coverage over a relatively small area (e.g., a residence) may be referred to as a small cell. It should be appreciated that the teachings herein may be applicable to nodes associated with other types of coverage areas. For example, a pico access point may provide coverage (e.g., coverage within a commercial building) over an area that is smaller than a macro area and larger than a femto area. In various applications, other terminology may be used to reference a macrocell, a small cell, or other access point-type nodes. For example, a macrocell may be configured or referred to as an access node, base station, access point, eNodeB, macro, and so on. Also, a small cell may be configured or referred to as a Home NodeB, Home eNodeB, access point base station, femto cell, and so on. In some implementations, a node may be associated with (e.g., referred to as or divided into) one or more cells or sectors. A cell or sector associated with a macro access point, a femto access point, or a pico access point may be referred to as a macro cell, a femto cell, or a pico cell, respectively.

Figure 12:
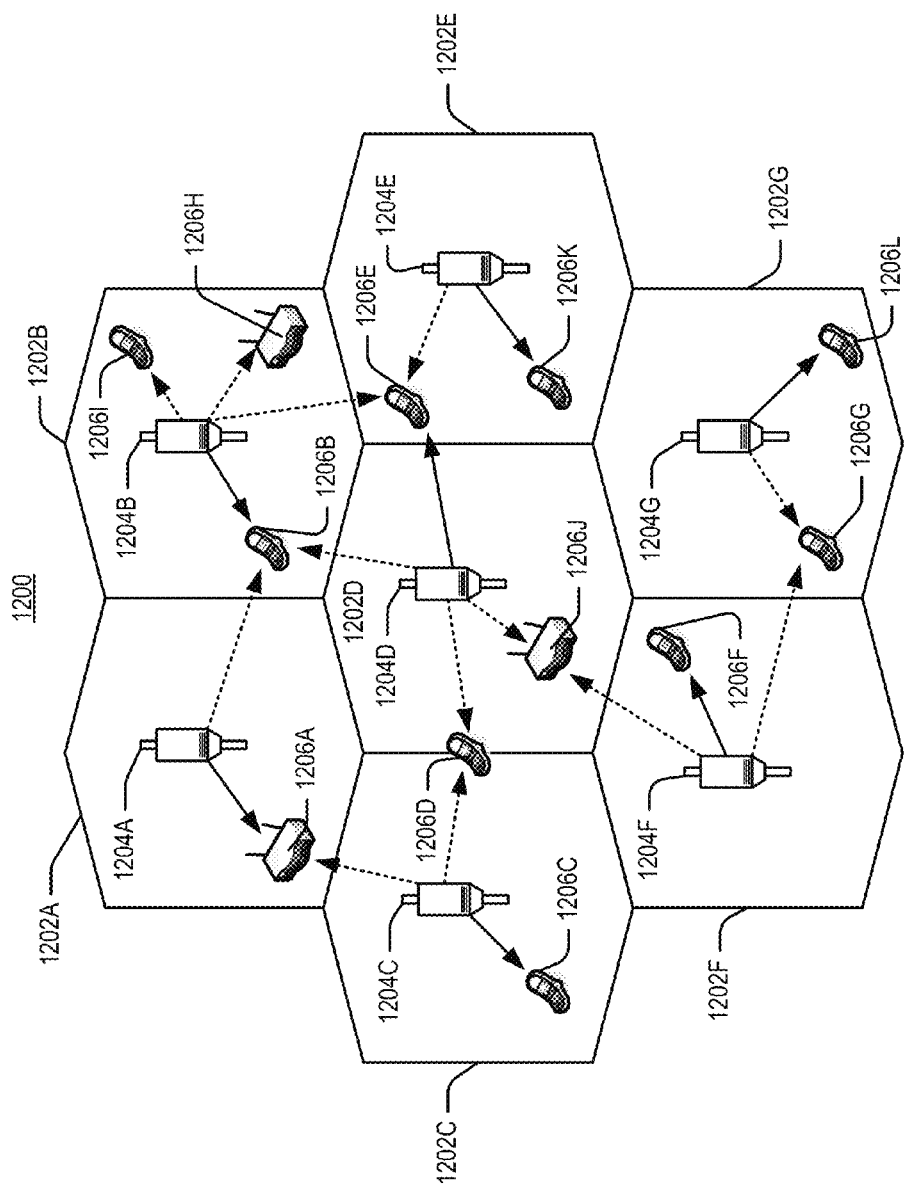
FIG. 12 is a simplified diagram of a wireless communication system.

FIG. 12 illustrates a wireless communication system 1200, configured to support a number of users, in which the teachings herein may be implemented. The system 1200 provides communication for multiple cells 1202, such as, for example, macro cells 1202A-1202G, with each cell being serviced by a corresponding access point 1204 (e.g., access points 1204A-1204G). As shown in FIG. 12, access terminals 1206 (e.g., access terminals 1206A-1206L) may be dispersed at various locations throughout the system over time. Each access terminal 1206 may communicate with one or more access points 1204 on a forward link (FL) and/or a reverse link (RL) at a given moment, depending upon whether the access terminal 1206 is active and whether it is in soft handoff, for example. The wireless communication system 1200 may provide service over a large geographic region. For example, macro cells 1202A-1202G may cover a few blocks in a neighborhood or several miles in a rural environment.

Figure 13:
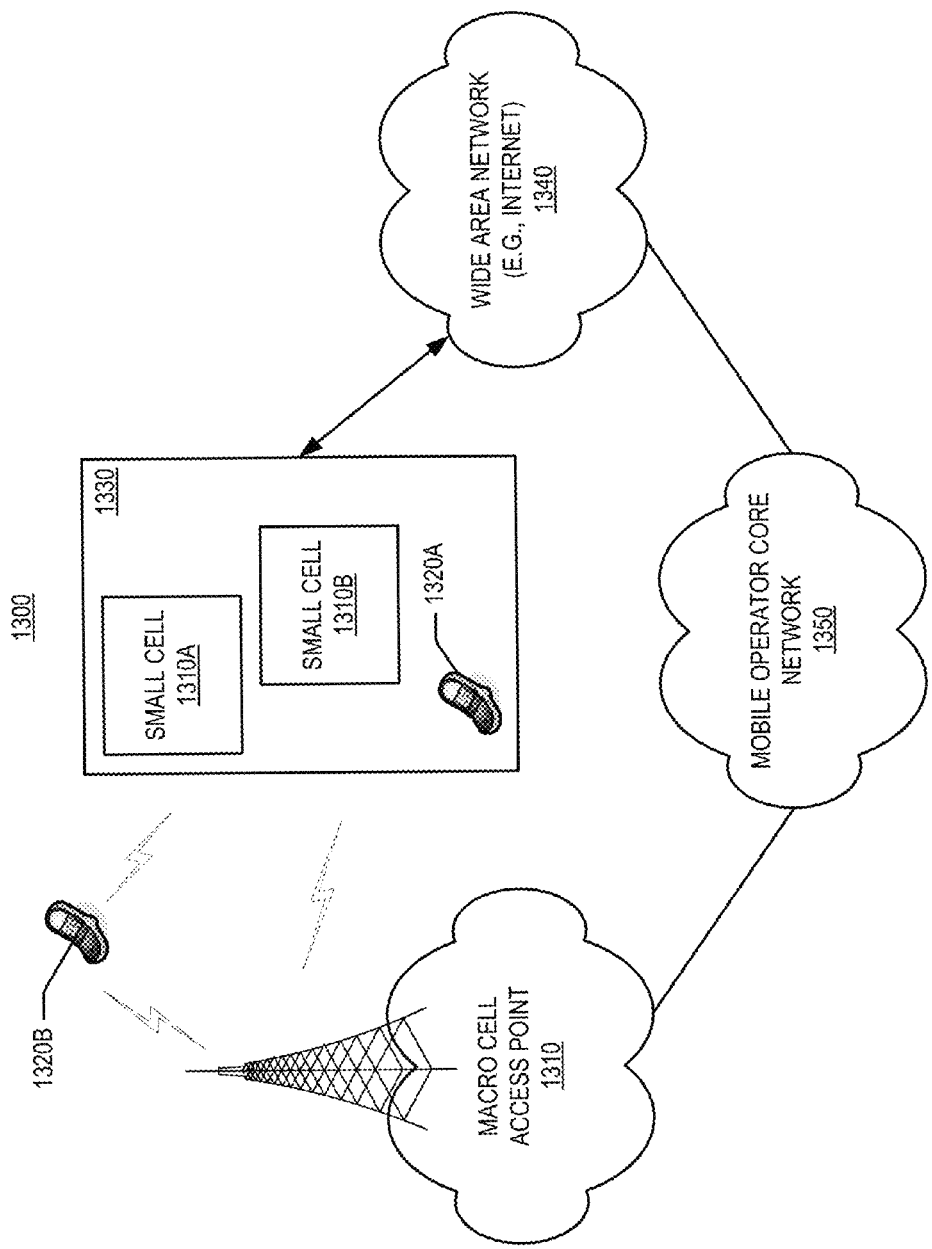
FIG. 13 is a simplified diagram of a wireless communication system including small cells.

FIG. 13 illustrates an exemplary communication system 1300 where one or more small cells are deployed within a network environment. Specifically, the system 1300 includes multiple small cells 1310 (e.g., small cells 1310A and 1310B) installed in a relatively small-scale network environment (e.g., in one or more user residences or enterprise locations 1330). Each small cell 1310 may be coupled to a wide area network 1340 (e.g., the Internet) and a mobile operator core network 1350 via a DSL router, a cable modem, a wireless link, or other connectivity means (not shown). As will be discussed below, each small cell 1310 may be configured to serve associated access terminals 1320 (e.g., access terminal 1320A) and, optionally, other (e.g., hybrid or alien) access terminals 1320 (e.g., access terminal 1320B). In other words, access to small cells 1310 may be restricted whereby a given access terminal 1320 may be served by a set of designated (e.g., home) small cell(s) 1310 but may not be served by any non-designated small cells 1310 (e.g., a neighbor's small cell 1310).

Figure 14:
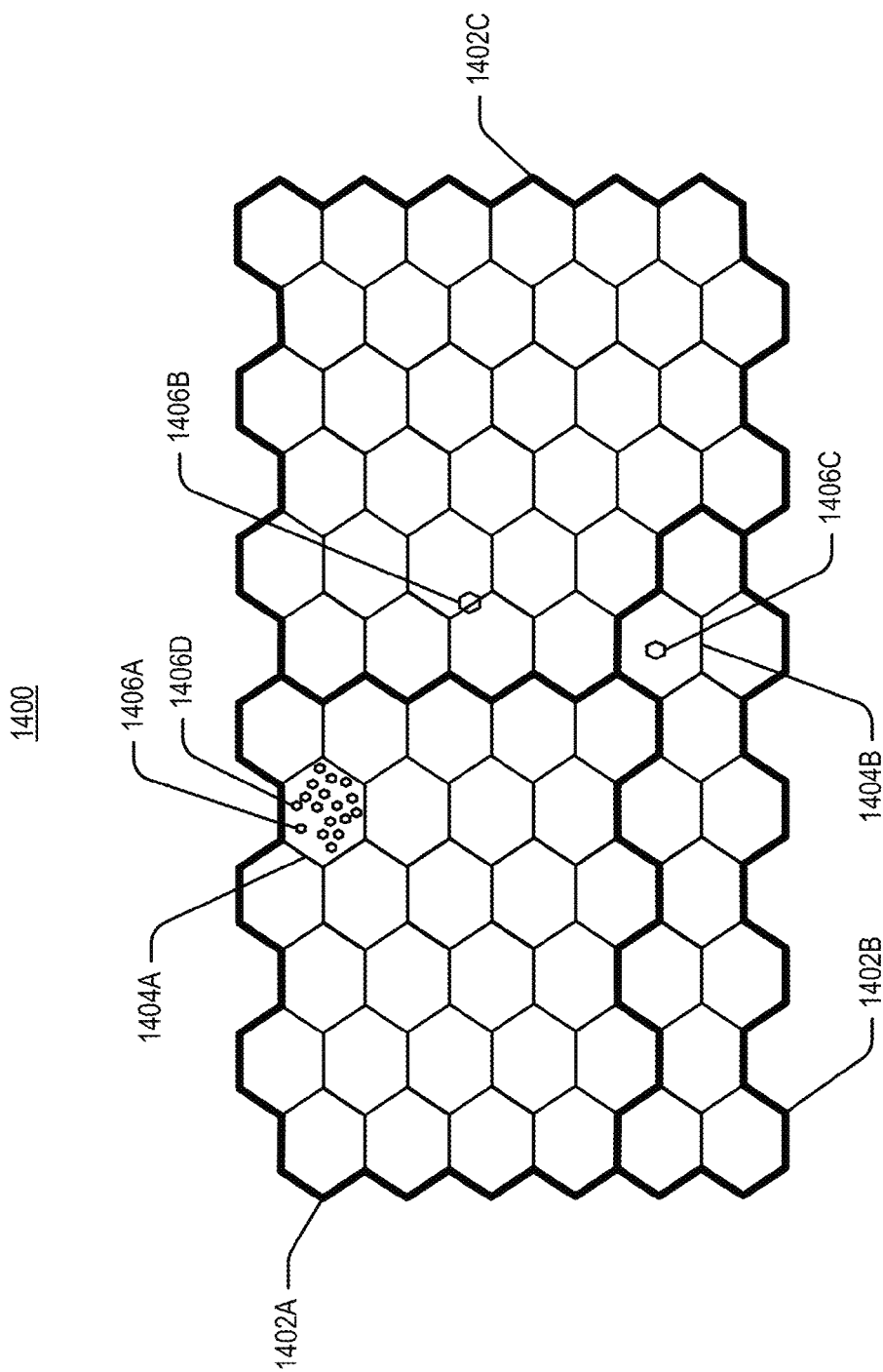
FIG. 14 is a simplified diagram illustrating coverage areas for wireless communication.

FIG. 14 illustrates an example of a coverage map 1400 where several tracking areas 1402 (or routing areas or location areas) are defined, each of which includes several macro coverage areas 1404. Here, areas of coverage associated with tracking areas 1402A, 1402B, and 1402C are delineated by the wide lines and the macro coverage areas 1404 are represented by the larger hexagons. The tracking areas 1402 also include femto coverage areas 1406. In this example, each of the femto coverage areas 1406 (e.g., femto coverage areas 1406B and 1406C) is depicted within one or more macro coverage areas 1404 (e.g., macro coverage areas 1404A and 1404B). It should be appreciated, however, that some or all of a femto coverage area 1406 might not lie within a macro coverage area 1404. In practice, a large number of femto coverage areas 1406 (e.g., femto coverage areas 1406A and 1406D) may be defined within a given tracking area 1402 or macro coverage area 1404. Also, one or more pico coverage areas (not shown) may be defined within a given tracking area 1402 or macro coverage area 1404.

Referring again to FIG. 13, the owner of a small cell 1310 may subscribe to mobile service, such as, for example, 3G mobile service, offered through the mobile operator core network 1350. In addition, an access terminal 1320 may be capable of operating both in macro environments and in smaller scale (e.g., residential) network environments. In other words, depending on the current location of the access terminal 1320, the access terminal 1320 may be served by a macro cell access point 1360 associated with the mobile operator core network 1350 or by any one of a set of small cells 1310 (e.g., the small cells 1310A and 1310B that reside within a corresponding user residence 1330). For example, when a subscriber is outside his home, he is served by a standard macro access point (e.g., access point 1360) and when the subscriber is at home, he is served by a small cell (e.g., small cell 1310A). Here, a small cell 1310 may be backward compatible with legacy access terminals 1320.

A small cell 1310 may be deployed on a single frequency or, in the alternative, on multiple frequencies. Depending on the particular configuration, the single frequency or one or more of the multiple frequencies may overlap with one or more frequencies used by a macro access point (e.g., access point 1360).

In some aspects, an access terminal 1320 may be configured to connect to a preferred small cell (e.g., the home small cell of the access terminal 1320) whenever such connectivity is possible. For example, whenever the access terminal 1320A is within the user's residence 1330, it may be desired that the access terminal 1320A communicate only with the home small cell 1310A or 1310B.

In some aspects, if the access terminal 1320 operates within the macro cellular network 1350 but is not residing on its most preferred network (e.g., as defined in a preferred roaming list), the access terminal 1320 may continue to search for the most preferred network (e.g., the preferred small cell 1310) using a better system reselection (BSR) procedure, which may involve a periodic scanning of available systems to determine whether better systems are currently available and subsequently acquire such preferred systems. The access terminal 1320 may limit the search for specific band and channel. For example, one or more femto channels may be defined whereby all small cells (or all restricted small cells) in a region operate on the femto channel(s). The search for the most preferred system may be repeated periodically. Upon discovery of a preferred small cell 1310, the access terminal 1320 selects the small cell 1310 and registers on it for use when within its coverage area.

Access to a small cell may be restricted in some aspects. For example, a given small cell may only provide certain services to certain access terminals. In deployments with so-called restricted (or closed) access, a given access terminal may only be served by the macro cell mobile network and a defined set of small cells (e.g., the small cells 1310 that reside within the corresponding user residence 1330). In some implementations, an access point may be restricted to not provide, for at least one node (e.g., access terminal), at least one of: signaling, data access, registration, paging, or service.

In some aspects, a restricted small cell (which may also be referred to as a Closed Subscriber Group Home NodeB) is one that provides service to a restricted provisioned set of access terminals. This set may be temporarily or permanently extended as necessary. In some aspects, a Closed Subscriber Group (CSG) may be defined as the set of access points (e.g., small cells) that share a common access control list of access terminals.

Various relationships may thus exist between a given small cell and a given access terminal. For example, from the perspective of an access terminal, an open small cell may refer to a small cell with unrestricted access (e.g., the small cell allows access to any access terminal). A restricted small cell may refer to a small cell that is restricted in some manner (e.g., restricted for access and/or registration). A home small cell may refer to a small cell on which the access terminal is authorized to access and operate on (e.g., permanent access is provided for a defined set of one or more access terminals). A hybrid (or guest) small cell may refer to a small cell on which different access terminals are provided different levels of service (e.g., some access terminals may be allowed partial and/or temporary access while other access terminals may be allowed full access). An alien small cell may refer to a small cell on which the access terminal is not authorized to access or operate on, except for perhaps emergency situations (e.g., 911 calls).

From a restricted small cell perspective, a home access terminal may refer to an access terminal that is authorized to access the restricted small cell installed in the residence of that access terminal's owner (usually the home access terminal has permanent access to that small cell). A guest access terminal may refer to an access terminal with temporary access to the restricted small cell (e.g., limited based on deadline, time of use, bytes, connection count, or some other criterion or criteria). An alien access terminal may refer to an access terminal that does not have permission to access the restricted small cell, except for perhaps emergency situations, for example, such as 911 calls (e.g., an access terminal that does not have the credentials or permission to register with the restricted small cell).

The teachings herein may be employed in a wireless multiple-access communication system that simultaneously supports communication for multiple wireless access terminals. Here, each terminal may communicate with one or more access points via transmissions on the forward and reverse links. The forward link (or downlink) refers to the communication link from the access points to the terminals, and the reverse link (or uplink) refers to the communication link from the terminals to the access points. This communication link may be established via a single-in-single-out system, a multiple-in-multiple-out (MIMO) system, or some other type of system.

A MIMO system employs multiple ($N_T$) transmit antennas and multiple ($N_R$) receive antennas for data transmission. A MIMO channel formed by the $N_T$ transmit and $N_R$ receive antennas may be decomposed into $N_S$ independent channels, which are also referred to as spatial channels, where $N_S \leq \min\{N_T, N_R\}$. Each of the $N_S$ independent channels corresponds to a dimension. The MIMO system may provide improved performance (e.g., higher throughput and/or greater reliability) if the additional dimensionalities created by the multiple transmit and receive antennas are utilized.

A MIMO system may support time division duplex (TDD) and frequency division duplex (FDD). In a TDD system, the forward and reverse link transmissions are on the same frequency region so that the reciprocity principle allows the estimation of the forward link channel from the reverse link channel. This enables the access point to extract transmit beam-forming gain on the forward link when multiple antennas are available at the access point.

Figure 15:
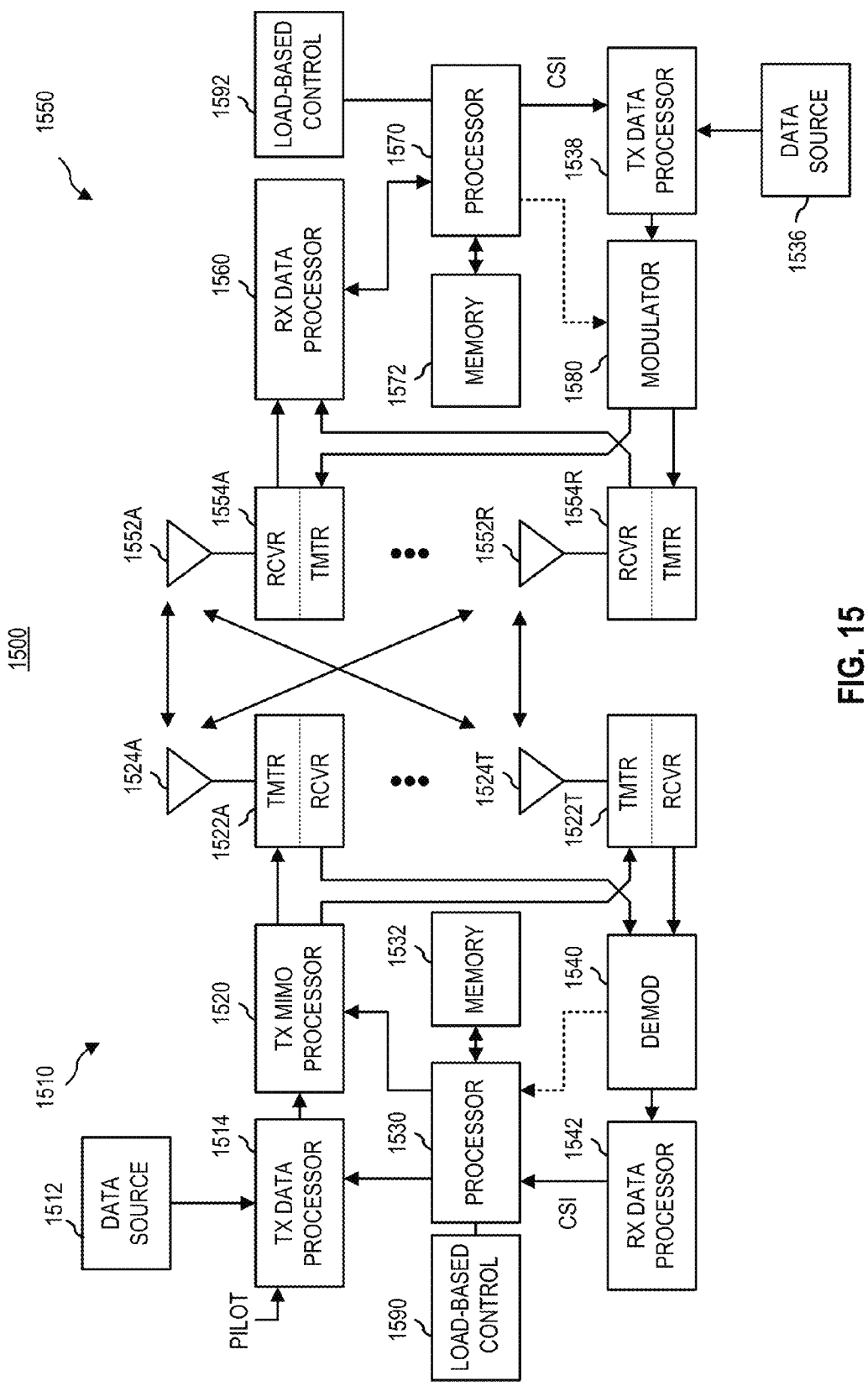
FIG. 15 is a simplified block diagram of several sample aspects of communication components.

FIG. 15 illustrates a wireless device 1510 (e.g., an access point) and a wireless device 1550 (e.g., an access terminal) of a sample MIMO system 1500. At the device 1510, traffic data for a number of data streams is provided from a data source 1512 to a transmit (TX) data processor 1514. Each data stream may then be transmitted over a respective transmit antenna.

The TX data processor 1514 formats, codes, and interleaves the traffic data for each data stream based on a particular coding scheme selected for that data stream to provide coded data. The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream is then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by a processor 1530. A data memory 1532 may store program code, data, and other information used by the processor 1530 or other components of the device 1510.

The modulation symbols for all data streams are then provided to a TX MIMO processor 1520, which may further process the modulation symbols (e.g., for OFDM). The TX MIMO processor 1520 then provides $N_T$ modulation symbol streams to $N_T$ transceivers (XCVR) 1522A through 1522T. In some aspects, the TX MIMO processor 1520 applies beam-forming weights to the symbols of the data streams and to the antenna from which the symbol is being transmitted.

Each transceiver 1522 receives and processes a respective symbol stream to provide one or more analog signals, and further conditions (e.g., amplifies, filters, and upconverts) the analog signals to provide a modulated signal suitable for transmission over the MIMO channel. $N_T$ modulated signals from transceivers 1522A through 1522T are then transmitted from $N_T$ antennas 1524A through 1524T, respectively.

At the device 1550, the transmitted modulated signals are received by $N_R$ antennas 1552A through 1552R and the received signal from each antenna 1552 is provided to a respective transceiver (XCVR) 1554A through 1554R. Each transceiver 1554 conditions (e.g., filters, amplifies, and downconverts) a respective received signal, digitizes the conditioned signal to provide samples, and further processes the samples to provide a corresponding "received" symbol stream.

A receive (RX) data processor 1560 then receives and processes the $N_R$ received symbol streams from $N_R$ transceivers 1554 based on a particular receiver processing technique to provide $N_T$ "detected" symbol streams. The RX data processor 1560 then demodulates, deinterleaves, and decodes each detected symbol stream to recover the traffic data for the data stream. The processing by the RX data processor 1560 is complementary to that performed by the TX MIMO processor 1520 and the TX data processor 1514 at the device 1510.

A processor 1570 periodically determines which pre-coding matrix to use (discussed below). The processor 1570 formulates a reverse link message comprising a matrix index portion and a rank value portion. A data memory 1572 may store program code, data, and other information used by the processor 1570 or other components of the device 1550.

The reverse link message may comprise various types of information regarding the communication link and/or the received data stream. The reverse link message is then processed by a TX data processor 1538, which also receives traffic data for a number of data streams from a data source 1536, modulated by a modulator 1580, conditioned by the transceivers 1554A through 1554R, and transmitted back to the device 1510.

At the device 1510, the modulated signals from the device 1550 are received by the antennas 1524, conditioned by the transceivers 1522, demodulated by a demodulator (DEMOD) 1540, and processed by a RX data processor 1542 to extract the reverse link message transmitted by the device 1550. The processor 1530 then determines which pre-coding matrix to use for determining the beam-forming weights then processes the extracted message.

FIG. 15 also illustrates that the communication components may include one or more components that perform access load-based control operations as taught herein. For example, a load-based control component 1590 may cooperate with the processor 1530 and/or other components of the device 1510 to determine loading at another device (e.g., an access point) based on received signals and take appropriate action as taught herein. Similarly, a load-based control component 1592 may cooperate with the processor 1570 and/or other components of the device 1550 to determine loading at another device (e.g., an access point) based on received signals and take appropriate action as taught herein. It should be appreciated that for each device 1510 and 1550 the functionality of two or more of the described components may be provided by a single component. For example, a single processing component may provide the functionality of the load-based control component 1590 and the processor 1530 and a single processing component may provide the functionality of the load-based control component 1592 and the processor 1570.

The teachings herein may be incorporated into various types of communication systems and/or system components. In some aspects, the teachings herein may be employed in a multiple-access system capable of supporting communication with multiple users by sharing the available system resources (e.g., by specifying one or more of bandwidth, transmit power, coding, interleaving, and so on). For example, the teachings herein may be applied to any one or combinations of the following technologies: Code Division Multiple Access (CDMA) systems, Multiple-Carrier CDMA (MCCDMA), Wideband CDMA (W-CDMA), High-Speed Packet Access (HSPA, HSPA+) systems, Time Division Multiple Access (TDMA) systems, Frequency Division Multiple Access (FDMA) systems, Single-Carrier FDMA (SC-FDMA) systems, Orthogonal Frequency Division Multiple Access (OFDMA) systems, or other multiple access techniques. A wireless communication system employing the teachings herein may be designed to implement one or more standards, such as IS-95, cdma2000, IS-856, W-CDMA, TDSCDMA, and other standards. A CDMA network may implement a radio technology such as Universal Terrestrial Radio Access (UTRA), cdma2000, or some other technology.

UTRA includes W-CDMA and Low Chip Rate (LCR). The cdma2000 technology covers IS-2000, IS-95 and IS-856 standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA, E-UTRA, and GSM are part of Universal Mobile Telecommunication System (UMTS). The teachings herein may be implemented in a 3GPP Long Term Evolution (LTE) system, an LTE-Advanced (LTE-A) system, an Ultra-Mobile Broadband (UMB) system, and other types of systems. LTE is a release of UMTS that uses E-UTRA. UTRA, E-UTRA, GSM, UMTS, LTE, and LTE-A are described in documents from an organization named "3rd Generation Partnership Project" (3GPP), while cdma2000 is described in documents from an organization named "3rd Generation Partnership Project 2" (3GPP2). Although certain aspects of the disclosure may be described using 3GPP terminology, it is to be understood that the teachings herein may be applied to 3GPP (e.g., Rel99, Rel5, Rel6, Rel7) technology, as well as 3GPP2 (e.g., 1×RTT, 1×EV-DO Rel0, RevA, RevB) technology and other technologies.

The teachings herein may be incorporated into (e.g., implemented within or performed by) a variety of apparatuses (e.g., device or nodes). In some aspects, an apparatus (e.g., a wireless device or node) implemented in accordance with the teachings herein may comprise an access point, a relay, or an access terminal.

For example, an access terminal may comprise, be implemented as, or known as user equipment, a subscriber station, a subscriber unit, a mobile station, a mobile, a mobile node, a remote station, a remote terminal, a user terminal, a user agent, a user device, or some other terminology. In some implementations, an access terminal may comprise a cellular telephone, a cordless telephone, a session initiation protocol (SIP) phone, a wireless local loop (WLL) station, a personal digital assistant (PDA), a handheld device having wireless connection capability, or some other suitable processing device connected to a wireless modem. Accordingly, one or more aspects taught herein may be incorporated into a phone (e.g., a cellular phone or smart phone), a computer (e.g., a laptop), a tablet, a portable communication device, a portable computing device (e.g., a personal data assistant), an entertainment device (e.g., a music device, a video device, or a satellite radio), a global positioning system device, or any other suitable device that is configured to communicate via a wireless medium.

An access point may comprise, be implemented as, or known as a NodeB, an eNodeB, a radio network controller (RNC), a base station (BS), a radio base station (RBS), a base station controller (BSC), a base transceiver station (BTS), a transceiver function (TF), a radio transceiver, a radio router, a basic service set (BSS), an extended service set (ESS), a macro cell, a macro node, a Home eNB (HeNB), a femto cell, a femto node, a pico node, or some other similar terminology.

In some aspects, a relay may be used to extend the coverage of an access point. To this end, a relay may include access terminal functionality (e.g., for communicating with an access point) as well as access point functionality (e.g., for communicating with an access terminal).

In some aspects, an apparatus (e.g., an access point or relay) may comprise an access node for a communication system. Such an access node may provide, for example, connectivity for or to a network (e.g., a wide area network such as the Internet or a cellular network) via a wired or wireless communication link to the network. Accordingly, an access node may enable another node (e.g., an access terminal) to access a network or some other functionality. In addition, it should be appreciated that one or both of the nodes may be portable or, in some cases, relatively non-portable.

It should be appreciated that a wireless apparatus may be capable of transmitting and/or receiving information in a non-wireless manner (e.g., via a wired connection). Thus, a receiver and a transmitter as discussed herein may, in some cases, include appropriate communication interface components (e.g., electrical or optical interface components) to communicate via a non-wireless medium.

A wireless node may communicate via one or more wireless communication links that are based on or otherwise support any suitable wireless communication technology. For example, in some aspects a wireless node may associate with a network. In some aspects, the network may comprise a local area network or a wide area network. A wireless device may support or otherwise use one or more of a variety of wireless communication technologies, protocols, or standards such as those discussed herein (e.g., CDMA, TDMA, OFDM, OFDMA, WiMAX, Wi-Fi, and so on). Similarly, a wireless node may support or otherwise use one or more of a variety of corresponding modulation or multiplexing schemes. A wireless node may thus include appropriate components (e.g., air interfaces) to establish and communicate via one or more wireless communication links using the above or other wireless communication technologies. For example, a wireless node may comprise a wireless transceiver with associated transmitter and receiver components that may include various components (e.g., signal generators and signal processors) that facilitate communication over a wireless medium.

The functionality described herein (e.g., with regard to one or more of the accompanying figures) may correspond in some aspects to similarly designated "means for" functionality in the appended claims. Examples of such functionality will be described with reference to the interrelated functional modules (e.g., comprising electrical circuits) depicted in FIGS. 16-17. In practice, one or more of these modules may be communicatively coupled via one or more signaling buses.

Figure 16:
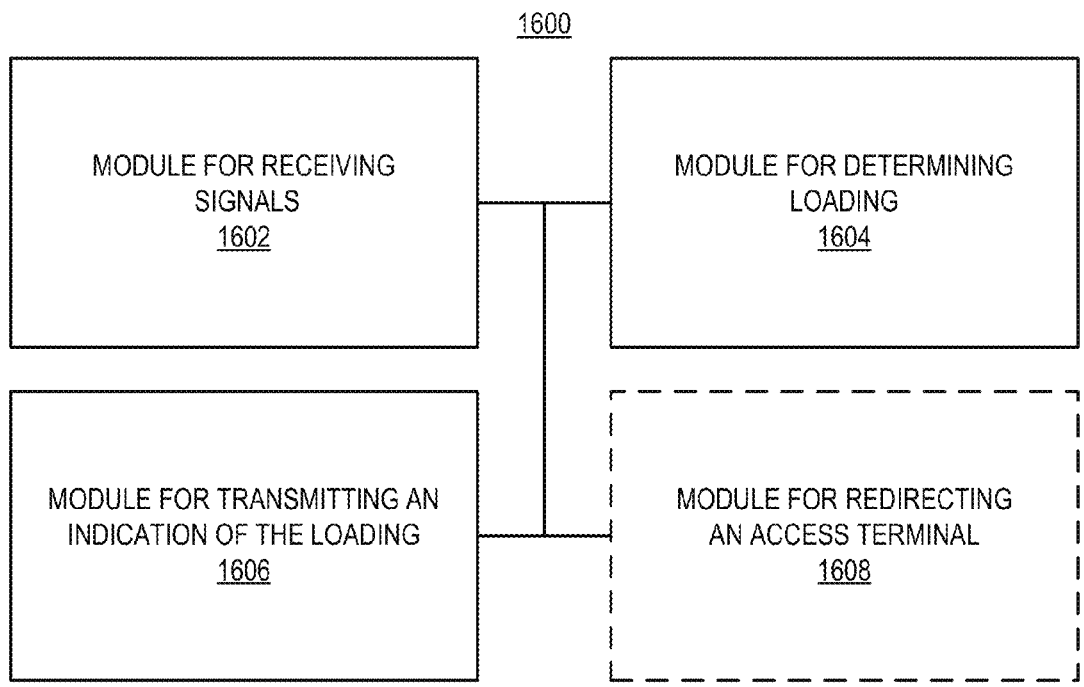
FIGS. 16 and 17 are simplified block diagrams of several sample aspects of apparatuses configured to provide load-related as taught herein.

Referring to FIG. 16, an apparatus 1600 is represented as a series of interrelated functional modules. Here, a module for receiving signal 1602 may correspond at least in some aspects to, for example, a receiver as discussed herein. A module for determining loading 1604 may correspond at least in some aspects to, for example, a processing system as discussed herein. A module for transmitting an indication of the loading 1606 may correspond at least in some aspects to, for example, a transmitter as discussed herein. A module for redirecting an access terminal 1608 may correspond at least in some aspects to, for example, a processing system as discussed herein.

Figure 17:
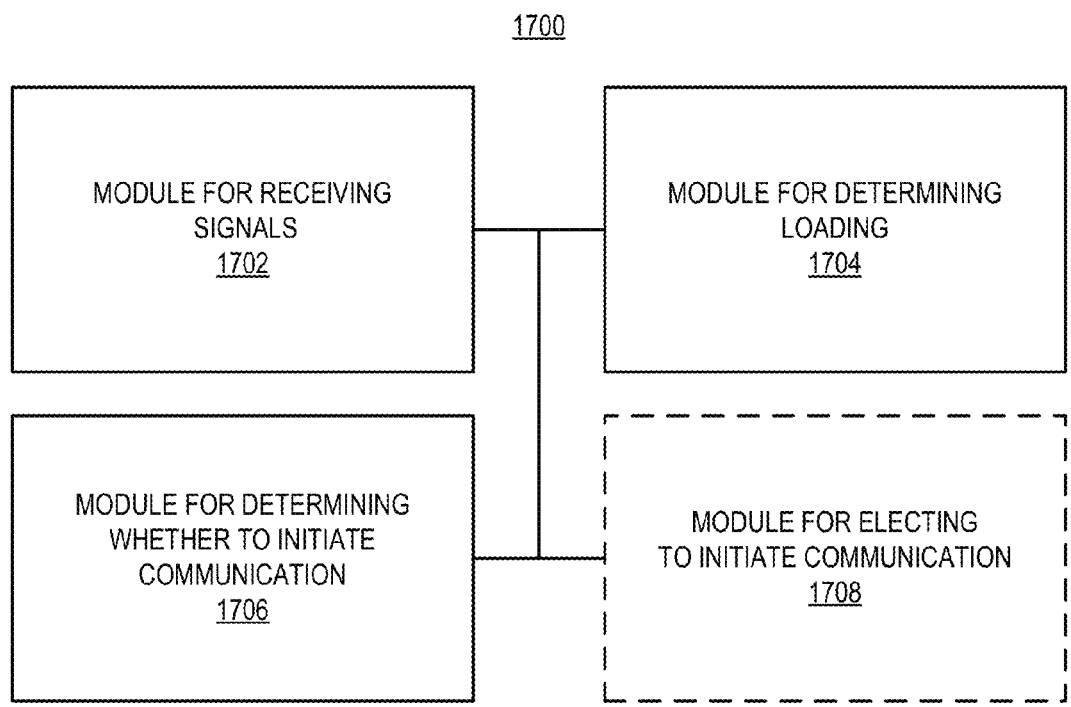

Referring to FIG. 17, an apparatus 1700 is represented as a series of interrelated functional modules. Here, a module for receiving signals 1702 may correspond at least in some aspects to, for example, a receiver as discussed herein. A module for determining loading 1704 may correspond at least in some aspects to, for example, a processing system as discussed herein. A module for determining whether to initiate communication 1706 may correspond at least in some aspects to, for example, a processing system as discussed herein. A module for electing to initiate communication 1708 may correspond at least in some aspects to, for example, a processing system as discussed herein.

The functionality of the modules of FIGS. 16-17 may be implemented in various ways consistent with the teachings herein. In some aspects, the functionality of these modules may be implemented as one or more electrical components. In some aspects, the functionality of these blocks may be implemented as a processing system including one or more processor components. In some aspects, the functionality of these modules may be implemented using, for example, at least a portion of one or more integrated circuits (e.g., an ASIC). As discussed herein, an integrated circuit may include a processor, software, other related components, or some combination thereof. Thus, the functionality of different modules may be implemented, for example, as different subsets of an integrated circuit, as different subsets of a set of software modules, or a combination thereof. Also, it should be appreciated that a given subset (e.g., of an integrated circuit and/or of a set of software modules) may provide at least a portion of the functionality for more than one module. As one specific example, the apparatus 1600 may comprise a single device (e.g., components 1602-1608 comprising different sections of an ASIC). As another specific example, the apparatus 1600 may comprise several devices (e.g., the components 1602 and 1606 comprising one ASIC and the components 1604 and 1608 comprising another ASIC). The functionality of these modules also may be implemented in some other manner as taught herein. In some aspects one or more of any dashed blocks in FIGS. 16-17 are optional.

In addition, the components and functions represented by FIGS. 16-17 as well as other components and functions described herein, may be implemented using any suitable means. Such means also may be implemented, at least in part, using corresponding structure as taught herein. For example, the components described above in conjunction with the "module for" components of FIGS. 16-17 also may correspond to similarly designated "means for" functionality. Thus, in some aspects one or more of such means may be implemented using one or more of processor components, integrated circuits, or other suitable structure as taught herein.

In some aspects, an apparatus or any component of an apparatus may be configured to (or operable to or adapted to) provide functionality as taught herein. This may be achieved, for example: by manufacturing (e.g., fabricating) the apparatus or component so that it will provide the functionality; by programming the apparatus or component so that it will provide the functionality; or through the use of some other suitable implementation technique. As one example, an integrated circuit may be fabricated to provide the requisite functionality. As another example, an integrated circuit may be fabricated to support the requisite functionality and then configured (e.g., via programming) to provide the requisite functionality. As yet another example, a processor circuit may execute code to provide the requisite functionality.

It should be understood that any reference to an element herein using a designation such as "first," "second," and so forth does not generally limit the quantity or order of those elements. Rather, these designations may be used herein as a convenient method of distinguishing between two or more elements or instances of an element. Thus, a reference to first and second elements does not mean that only two elements may be employed there or that the first element must precede the second element in some manner. Also, unless stated otherwise a set of elements may comprise one or more elements. In addition, terminology of the form "at least one of A, B, or C" or "one or more of A, B, or C" or "at least one of the group consisting of A, B, and C" used in the description or the claims means "A or B or C or any combination of these elements." For example, this terminology may include A, or B, or C, or A and B, or A and C, or A and B and C, or 2A, or 2B, or 2C, and so on.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that any of the various illustrative logical blocks, modules, processors, means, circuits, and algorithm steps described in connection with the aspects disclosed herein may be implemented as electronic hardware (e.g., a digital implementation, an analog implementation, or a combination of the two, which may be designed using source coding or some other technique), various forms of program or design code incorporating instructions (which may be referred to herein, for convenience, as "software" or a "software module"), or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented within or performed by a processing system, an integrated circuit ("IC"), an access terminal, or an access point. A processing system may be implemented using one or more ICs or may be implemented within an IC (e.g., as part of a system on a chip). An IC may comprise a general purpose processor, a digital signal processor (DSP), an application specific integrated circuit (ASIC), a field programmable gate array (FPGA) or other programmable logic device, discrete gate or transistor logic, discrete hardware components, electrical components, optical components, mechanical components, or any combination thereof designed to perform the functions described herein, and may execute codes or instructions that reside within the IC, outside of the IC, or both. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

It is understood that any specific order or hierarchy of steps in any disclosed process is an example of a sample approach. Based upon design preferences, it is understood that the specific order or hierarchy of steps in the processes may be rearranged while remaining within the scope of the present disclosure. The accompanying method claims present elements of the various steps in a sample order, and are not meant to be limited to the specific order or hierarchy presented.

The steps of a method or algorithm described in connection with the aspects disclosed herein may be embodied directly in hardware, in a software module executed by a processor, or in a combination of the two. A software module (e.g., including executable instructions and related data) and other data may reside in a memory such as RAM memory, flash memory, ROM memory, EPROM memory, EEPROM memory, registers, a hard disk, a removable disk, a CD-ROM, or any other form of computer-readable storage medium known in the art. A sample storage medium may be coupled to a machine such as, for example, a computer/processor (which may be referred to herein, for convenience, as a "processor") such the processor can read information (e.g., code) from and write information to the storage medium. A sample storage medium may be integral to the processor. The processor and the storage medium may reside in an ASIC. The ASIC may reside in user equipment. In the alternative, the processor and the storage medium may reside as discrete components in user equipment. Moreover, in some aspects any suitable computer-program product may comprise a computer-readable medium comprising code(s) executable (e.g., executable by at least one computer) to provide functionality relating to one or more of the aspects of the disclosure. In some aspects, a computer program product may comprise packaging materials.

In one or more exemplary embodiments, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A computer-readable media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Thus, in some aspects computer readable medium may comprise non-transitory computer-readable medium (e.g., tangible media, computer-readable storage medium, computer-readable storage device, etc.). Such a non-transitory computer-readable medium (e.g., computer-readable storage device) may comprise any of the tangible forms of media described herein or otherwise known (e.g., a memory device, a media disk, etc.). In addition, in some aspects computer-readable medium may comprise transitory computer readable medium (e.g., comprising a signal). Combinations of the above should also be included within the scope of computer-readable media. It should be appreciated that a computer-readable medium may be implemented in any suitable computer-program product.

As used herein, the term "determining" encompasses a wide variety of actions. For example, "determining" may include calculating, computing, processing, deriving, investigating, looking up (e.g., looking up in a table, a database or another data structure), ascertaining, and the like. Also, "determining" may include receiving (e.g., receiving information), accessing (e.g., accessing data in a memory), and the like. Also, "determining" may include resolving, selecting, choosing, establishing, and the like.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the scope of the disclosure. Thus, the present disclosure is not intended to be limited to the aspects shown herein but is to be accorded the widest scope consistent with the principles and novel features disclosed herein.

What is claimed is:

1. An apparatus for wireless communication, comprising:
    a receiver configured to receive, at a first access point, radio frequency signals transmitted by at least one other access point;
    a processing system configured to determine, based on the received signals at the first access point, an indication of loading at each of the at least one other access point; and
    a transmitter configured to transmit, from the first access point to each of the at least one other access point, the indication of the loading at each of the at least one other access point.

2. The apparatus of claim 1, wherein the processing system is further configured to send a signal to an access terminal to redirect the access terminal to a selected access point of the at least one other access point based on the determination of the indication of the loading.

3. The apparatus of claim 1, wherein the loading comprises traffic load.

4. The apparatus of claim 1, wherein the loading comprises user load.

5. The apparatus of claim 1, wherein:
    the received signals comprise at least one downlink channelization code; and
    the determination of the indication of the loading is based on the at least one downlink channelization code.

6. The apparatus of claim 1, wherein:
    the signals received from a particular access point of the at least one other access point comprise a symbol sequence transmitted on a UMTS downlink channel; and
    the determination of the indication of the loading comprises:
        determining, based on the symbol sequence, an increase in a quantity of downlink channelization codes used by the particular access point, and
        determining, based on the increase in the quantity of downlink channelization codes used by the particular access point, that traffic load at the particular access point has increased in a corresponding manner.

7. The apparatus of claim 6, wherein a determination of whether a particular downlink channelization code is used comprises determining whether a normalized correlation value resulting from dispreading of the symbol sequence, according to the particular downlink channelization code, exceeds a threshold.

8. The apparatus of claim 1, wherein:
    the signals received from a particular access point of the at least one other access point comprise symbols transmitted in an AICH frame; and
    the determination of the indication of the loading comprises:
        determining, based on the symbols, an increase in a quantity of slots used in the AICH frame, and
        determining, based on the increase in the quantity of slots used, that RACH load at the particular access point has increased in a corresponding manner.

9. The apparatus of claim 8, wherein a determination of whether a particular slot is used comprises determining whether a normalized correlation value resulting from dispreading of the symbols associated with the particular slot, according to a channelization code for the AICH frame, exceeds a threshold.

10. The apparatus of claim 1, wherein:
the signals received from a particular access point of the at least one other access point comprise a sequence of OFDM symbols transmitted in a Physical Downlink Shared Channel (PDSCH); and
the determination of the indication of the loading comprises:
determining, based on the sequence of OFDM symbols, an increase in a quantity of LTE PDSCH resource elements used by the particular access point, and
determining, based on the increase in the quantity of LTE PDSCH resource elements used, that time-frequency resource usage at the particular access point has increased in a corresponding manner.

11. The apparatus of claim 10, wherein a determination of whether a particular LTE PDSCH resource element is used comprises performing DFT on the sequence of OFDM symbols and determining whether a resulting normalized correlation value associated with a subcarrier and an OFDM symbol of the particular LTE PDSCH resource element exceeds a threshold.

12. The apparatus of claim 1, wherein:
the received signals are indicative of a quantity of users served by the at least one other access point; and
the determination of the indication of the loading is based on the quantity of users served.

13. The apparatus of claim 1, wherein:
the signals received from a particular access point of the at least one other access point comprise symbols transmitted in a F-DPCH frame; and
the determination of the indication of the loading comprises:
determining, based on the symbols, a quantity of slots used in the F-DPCH frame,
determining, based on the quantity of slots used, an increase in a quantity of UMTS HSDPA users served by the particular access point, and
determining, based on the increase in the quantity of served UMTS HSDPA users, that user load at the particular access point has increased in a corresponding manner.

14. The apparatus of claim 13, wherein a determination of whether a particular slot is used comprises determining whether a normalized correlation value resulting from dispreading of the symbols associated with the particular slot, according to a channelization code for the F-DPCH frame, exceeds a threshold.

15. The apparatus of claim 1, wherein:
the signals received from a particular access point of the at least one other access point comprise symbols transmitted in an E-RGCH frame and/or an E-HICH frame; and
the determination of the indication of the loading comprises:
determining, based on the symbols, a quantity of used signatures per subframe in the E-RGCH frame and/or the E-HICH frame,
determining, based on the quantity of used signatures, an increase in a quantity of UMTS HSUPA users served by the particular access point, and
determining, based on the increase in the quantity of served UMTS HSUPA users, that user load at the particular access point has increased in a corresponding manner.

16. The apparatus of claim 15, wherein a determination of whether a particular signature of a particular subframe is used comprises determining whether a normalized correlation value resulting from dispreading of the symbols associated with the particular subframe, according to at least one channelization code for the E-RGCH frame and/or the E-HICH frame, exceeds a threshold.

17. The apparatus of claim 1, wherein:
the signals received from a particular access point of the at least one other access point are associated with at least one PHICH group; and
the determination of the indication of the loading comprises:
determining based on the signals, for each PHICH group of the at least one PHICH group, a quantity of PHICH codes used in the PHICH group,
determining, based on the quantity of PHICH codes used in the at least one PHICH group, an increase in a quantity of LTE PUSCH users served by the particular access point, and
determining, based on the increase in the quantity of served LTE PUSCH users, that user load at the particular access point has increased in a corresponding manner.

18. The apparatus of claim 17, wherein a determination of whether a particular PHICH code is used comprises determining whether a normalized correlation value resulting from dispreading of the signals, according to the particular PHICH code, exceeds a threshold.

19. The apparatus of claim 1, wherein, to determine the indication of the loading, the processing system is further configured to compare a normalized correlation value associated with the received signal to a threshold.

20. The apparatus of claim 1, wherein, to determine the indication of the loading, the processing system is further configured to determine a quantity of slots used in an AICH frame.

21. The apparatus of claim 1, wherein, to determine the indication of the loading, the processing system is further configured to determine a quantity of used LTE PDSCH resource elements.

22. The apparatus of claim 1, wherein, to determine the indication of the loading, the processing system is further configured to determine a quantity of slots used in an F-DPCH frame.

23. The apparatus of claim 1, wherein, to determine the indication of the loading, the processing system is further configured to determine a quantity of used signatures.

24. The apparatus of claim 1, wherein, to determine the indication of the loading, the processing system is further configured to determine a quantity of PHICH codes used in a PHICH group.

25. A method of wireless communication, comprising:
receiving, at a first access point, radio frequency signals transmitted by at least one other access point;
determining, based on the received signals at the first access point, an indication of loading at each of the at least one other access point; and
transmitting, from the first access point to each of the at least one other access point, the indication of the loading at each of the at least one other access point.

26. The method of claim 25, further comprising sending a signal to an access terminal to redirect the access terminal to a selected access point of the at least one other access point based on the determination of the indication of the loading.

27. The method of claim 25, wherein the loading comprises traffic load.

28. The method of claim 25, wherein the loading comprises user load.

29. The method of claim 25, wherein:
the received signals comprise at least one downlink channelization code; and
the determination of the indication of the loading is based on the at least one downlink channelization code.

30. The method of claim 25, wherein:
the signals received from a particular access point of the at least one other access point comprise a symbol sequence transmitted on a UMTS downlink channel; and
the determination of the indication of the loading comprises:
determining, based on the symbol sequence, an increase in a quantity of downlink channelization codes used by the particular access point, and
determining, based on the increase in the quantity of downlink channelization codes used by the particular access point, that traffic load at the particular access point has increased in a corresponding manner.

31. The method of claim 30, wherein a determination of whether a particular downlink channelization code is used comprises determining whether a normalized correlation value resulting from dispreading of the symbol sequence, according to the particular downlink channelization code, exceeds a threshold.

32. The method of claim 25, wherein:
the signals received from a particular access point of the at least one other access point comprise symbols transmitted in an AICH frame; and
the determination of the indication of the loading comprises:
determining, based on the symbols, an increase in a quantity of slots used in the AICH frame, and
determining, based on the increase in the quantity of slots used, that RACH load at the particular access point has increased in a corresponding manner.

33. The method of claim 32, wherein a determination of whether a particular slot is used comprises determining whether a normalized correlation value resulting from dispreading of the symbols associated with the particular slot, according to a channelization code for the AICH frame, exceeds a threshold.

34. The method of claim 25, wherein:
the signals received from a particular access point of the at least one other access point comprise a sequence of OFDM symbols transmitted in a Physical Downlink Shared Channel (PDSCH); and
the determination of the indication of the loading comprises:
determining, based on the sequence of OFDM symbols, an increase in a quantity of LTE PDSCH resource elements used by the particular access point, and
determining, based on the increase in the quantity of LTE PDSCH resource elements used, that time-frequency resource usage at the particular access point has increased in a corresponding manner.

35. The method of claim 34, wherein a determination of whether a particular LTE PDSCH resource element is used comprises performing DFT on the sequence of OFDM symbols and determining whether a resulting normalized correlation value associated with a subcarrier and an OFDM symbol of the particular LTE PDSCH resource element exceeds a threshold.

36. The method of claim 25, wherein:
the received signals are indicative of a quantity of users served by the at least one other access point; and
the determination of the indication of the loading is based on the quantity of users served.

37. The method of claim 25, wherein:
the signals received from a particular access point of the at least one other access point comprise symbols transmitted in a F-DPCH frame; and
the determination of the indication of the loading comprises:
determining, based on the symbols, a quantity of slots used in the F-DPCH frame,
determining, based on the quantity of slots used, an increase in a quantity of UMTS HSDPA users served by the particular access point, and
determining, based on the increase in the quantity of served UMTS HSDPA users, that user load at the particular access point has increased in a corresponding manner.

38. The method of claim 37, wherein a determination of whether a particular slot is used comprises determining whether a normalized correlation value resulting from dispreading of the symbols associated with the particular slot, according to a channelization code for the F-DPCH frame, exceeds a threshold.

39. The method of claim 25, wherein:
the signals received from a particular access point of the at least one other access point comprise symbols transmitted in an E-RGCH frame and/or an E-HICH frame; and
the determination of the indication of the loading comprises:
determining, based on the symbols, a quantity of used signatures per subframe in the E-RGCH frame and/or the E-HICH frame,
determining, based on the quantity of used signatures, an increase in a quantity of UMTS HSUPA users served by the particular access point, and
determining, based on the increase in the quantity of served UMTS HSUPA users, that user load at the particular access point has increased in a corresponding manner.

40. The method of claim 39, wherein a determination of whether a particular signature of a particular subframe is used comprises determining whether a normalized correlation value resulting from dispreading of the symbols associated with the particular subframe, according to at least one channelization code for the E-RGCH frame and/or the E-HICH frame, exceeds a threshold.

41. The method of claim 25, wherein:
the signals received from a particular access point of the at least one other access point are associated with at least one PHICH group; and
the determination of the indication of the loading comprises:
determining based on the signals, for each PHICH group of the at least one PHICH group, a quantity of PHICH codes used in the PHICH group,
determining, based on the quantity of PHICH codes used in the at least one PHICH group, an increase in a quantity of LTE PUSCH users served by the particular access point, and
determining, based on the increase in the quantity of served LTE PUSCH users, that user load at the particular access point has increased in a corresponding manner.

42. The method of claim 41, wherein a determination of whether a particular PHICH code is used comprises determining whether a normalized correlation value resulting from dispreading of the signals, according to the particular PHICH code, exceeds a threshold.

43. An apparatus for wireless communication, comprising:
means for receiving, at a first access point, radio frequency signals transmitted by at least one other access point;
means for determining, based on the received signals at the first access point, an indication of loading at each of the at least one other access point; and
means for transmitting, from the first access point to each of the at least one other access point, the indication of the loading at each of the at least one other access point.

44. The apparatus of claim 43, further comprising means for sending a signal to an access terminal to redirect the access terminal to a selected access point of the at least one other access point based on the determination of the indication of the loading.

45. The apparatus of claim 43, wherein the loading comprises traffic load.

46. The apparatus of claim 43, wherein the loading comprises user load.

47. A non-transitory computer-readable medium comprising code for causing a computer to:
receive, at a first access point, radio frequency signals transmitted by at least one other access point;
determine, based on the received signals at the first access point, an indication of loading at each of the at least one other access point; and
transmit, from the first access point to each of the at least one other access point, the indication of the loading at each of the at least one other access point.

48. The non-transitory computer readable medium of claim 47, further comprising code for causing the computer to send a signal to an access terminal to redirect the access terminal to a selected access point of the at least one other access point based on the determination of the indication of the loading.

* * * * *